United States Patent
Whetsell et al.

(10) Patent No.: US 10,762,276 B2
(45) Date of Patent: Sep. 1, 2020

(54) CROSS-REFERENCES WITHIN A HIERARCHICALLY STRUCTURED DOCUMENT

(71) Applicant: Paper Software LLC, New York, NY (US)

(72) Inventors: Nathan A. Whetsell, New York, NY (US); Benjamin S. Whetsell, New York, NY (US)

(73) Assignee: Paper Software LLC, New York, NY (US)

( * ) Notice: Subject to any disclaimer, the term of this patent is extended or adjusted under 35 U.S.C. 154(b) by 216 days.

(21) Appl. No.: 14/470,570

(22) Filed: Aug. 27, 2014

(65) Prior Publication Data

US 2015/0067477 A1    Mar. 5, 2015

Related U.S. Application Data

(60) Provisional application No. 61/870,367, filed on Aug. 27, 2013, provisional application No. 62/041,929, filed on Aug. 26, 2014.

(51) Int. Cl.
*G06F 40/00* (2020.01)
*G06F 40/131* (2020.01)
(Continued)

(52) U.S. Cl.
CPC .......... *G06F 40/131* (2020.01); *G06F 16/94* (2019.01); *G06F 40/137* (2020.01);
(Continued)

(58) Field of Classification Search
CPC .......... G06F 17/28; G06F 17/30; G06F 15/00; G06F 17/00; G06F 17/2229; G06F 16/94;
(Continued)

(56) References Cited

U.S. PATENT DOCUMENTS 5,557,722 A * 9/1996 DeRose ............... G06F 16/81
715/234
5,708,825 A * 1/1998 Sotomayor ........... G06F 40/134
715/205

(Continued)

FOREIGN PATENT DOCUMENTS

WO   WO 2014035407 A1 *  3/2014 ......... G06F 17/2881
WO   WO-2014035407 A1 *  3/2014 ......... G06F 17/2881

OTHER PUBLICATIONS

International Search Report and Written Opinion issued in corresponding application No. PCT/US2014/052959 dated Dec. 18, 2014.

(Continued)

*Primary Examiner* — William L Bashore
*Assistant Examiner* — David Faber
(74) *Attorney, Agent, or Firm* — Brian J. Colandreo; Heath M. Sargeant; Holland & Knight LLP

(57) ABSTRACT

A computer-implemented method, computer program product, and computing system is provided for creating and managing internal cross-references within a hierarchically structured document. In an implementation, a method may include identifying a cross-reference target within a hierarchically structured document. The method may also include determining one or more components of the cross-reference based upon, at least in part, a hierarchical location of the cross-reference target within the hierarchically structured document. The method may further include creating a cross-reference based upon, at least in part, the components of the cross-reference.

15 Claims, 9 Drawing Sheets

(51) Int. Cl.
*G06F 16/93* (2019.01)
*G06F 40/137* (2020.01)
*G06F 40/166* (2020.01)
*G06F 40/40* (2020.01)
*G06F 40/134* (2020.01)
(52) U.S. Cl.
CPC .......... *G06F 40/166* (2020.01); *G06F 40/134* (2020.01); *G06F 40/40* (2020.01)
(58) Field of Classification Search
CPC .. G06F 17/24; G06F 17/2241; G06F 17/2235; G06F 40/131; G06F 17/166; G06F 40/137; G06F 17/134; G06F 40/40
USPC .................................................. 715/234, 208
See application file for complete search history.

(56) References Cited

U.S. PATENT DOCUMENTS

| | | | | |
|---|---|---|---|---|
| 5,781,785 | A * | 7/1998 | Rowe ................... | G06F 40/149 715/234 |
| 7,246,310 | B1 * | 7/2007 | Wolfe .................... | G06F 16/34 715/236 |
| 2004/0174390 | A1 * | 9/2004 | Shah ...................... | G06Q 10/10 715/700 |
| 2004/0205047 | A1 | 10/2004 | Carpenter | |
| 2005/0005239 | A1 * | 1/2005 | Richards ............... | G06F 40/134 715/210 |
| 2005/0050444 | A1 * | 3/2005 | Vasey ................... | G06F 40/103 715/206 |
| 2005/0097452 | A1 * | 5/2005 | Eross ..................... | G06F 16/88 715/239 |
| 2005/0289446 | A1 * | 12/2005 | Moncsko ............ | G06F 16/9558 715/208 |
| 2006/0106775 | A1 | 5/2006 | Kuhn et al. | |
| 2006/0117073 | A1 * | 6/2006 | Bosworth ......... | G06F 17/30575 |
| 2007/0011134 | A1 * | 1/2007 | Langseth .......... | G06F 17/30563 |
| 2007/0112819 | A1 * | 5/2007 | Dettinger .............. | G06F 40/169 |
| 2010/0077000 | A1 * | 3/2010 | Kommers ......... | G06F 16/90324 707/772 |
| 2011/0161168 | A1 * | 6/2011 | Dubnicki .......... | G06F 17/30707 705/14.49 |
| 2011/0296291 | A1 * | 12/2011 | Melkinov ............. | G06F 40/131 715/229 |
| 2013/0019151 | A1 | 1/2013 | Whetsell et al. | |
| 2015/0169548 | A1 * | 6/2015 | Reiter ................. | G06F 17/2881 704/9 |
| 2015/0339278 | A1 * | 11/2015 | Bao ....................... | G06F 40/137 715/229 |

OTHER PUBLICATIONS

Extended European Search Report issued in couterpart application serial number 14839807.6 dated Apr. 5, 2017.
Australian Examination Report issued in Australian Patent App. No. 2014312365 dated Mar. 22, 2019.
Second Examination Report issued in counterpart Australian Patent Application No. 2014312365 dated Mar. 19, 2020; 3 pages.
First Examination Report dated Jul. 14, 2020 in counterpart Indian Patent Application No. 201617010239, 6 pages.

* cited by examiner

CROSS-REFERENCES WITHIN A HIERARCHICALLY STRUCTURED DOCUMENT

CROSS-REFERENCE TO RELATED APPLICATIONS

This application claims the benefit of U.S. provisional patent application Ser. No. 61/870,367, entitled "Algorithms Used in Turner to Create Cross-References," filed on Aug. 27, 2013; and also claims the benefit of U.S. provisional patent application Ser. No. 62/041,929, entitled "Cross-References Within a Hierarchically Structured Document," filed on Aug. 26, 2014, the entire contents of both of which are incorporated herein by reference.

TECHNICAL FIELD

The present disclosure generally relates to systems and method for providing and managing internal references within content, and more particularly relates to providing managing cross-references to content within a hierarchically structured document.

BACKGROUND

Many documents use hierarchical structure to improve comprehension and to allow for internal cross-referencing. However, managing hierarchical structure while editing a document can present many challenges. For example, during editing, elements may be added at various hierarchical levels, new hierarchical levels may be created and/or removed, and elements may be moved among hierarchical levels. Such changes may impact portions of the document other than those being directly edited. The impacted portions of the document may need to be updated in response to the edits, which may complicate the editing process.

SUMMARY OF DISCLOSURE

According to an implementation, a computer-implemented method may include identifying, by a processor, a cross-reference target within a hierarchically structured document. The method may also include determining, by the processor, one or more components of the cross-reference based upon, at least in part, a hierarchical location of the cross-reference target within the hierarchically structured document. The method may further include creating, by the processor, a cross-reference based upon, at least in part, the components for the cross-reference.

One or more of the following features may be included. The cross-reference target may include a portion of text within the hierarchically structured document. The hierarchically structured document may include a legal agreement.

The one or more components of the cross-reference may identify a hierarchical location of the cross-reference target within the hierarchically structured document. Determining the one or more components of the cross-reference may include identifying one or more ancestors of the cross-reference target within the hierarchically structured document. Determining the one or more components of the cross-reference may also include determining one or more components for each of the one or more ancestors of the cross-reference target.

The method may also include updating the cross-reference based upon, at least in part, a change in a hierarchical position of the cross-reference target within the hierarchically structured document.

According to another implementation, a computer program product may include a non-transitory computer readable storage medium having a plurality of instructions stored on it. When the instructions are executed by a processor, the instructions may cause the processor to perform operations including identifying a cross-reference target within a hierarchically structured document. Instructions may also be included for determining one or more components of the cross-reference based upon, at least in part, a hierarchical location of the cross-reference target within the hierarchically structured document. Instructions may further be included for creating a cross-reference based upon, at least in part, the components for the cross-reference.

One or more of the following features may be included. The cross-reference target may include a portion of text within the hierarchically structured document. The hierarchically structured document may include a legal agreement.

The one or more components of the cross-reference may identify a hierarchical location of the cross-reference target within the hierarchically structured document. Determining the one or more components of the cross-reference may include identifying one or more ancestors of the cross-reference target within the hierarchically structured document. Determining the one or more components of the cross-reference may also include determining one or more components for each of the one or more ancestors of the cross-reference target.

Instructions may also be included for updating the cross-reference based upon, at least in part, a change in a hierarchical position of the cross-reference target within the hierarchically structured document.

According to yet another implementation, a computing system may include a processor and a memory module coupled with the processor. The processor may be configured for identifying a cross-reference target within a hierarchically structured document. The processor may also be configured for determining one or more components of the cross-reference based upon, at least in part, a hierarchical location of the cross-reference target within the hierarchically structured document. The processor may further be configured for creating a cross-reference based upon, at least in part, the components for the cross-reference.

One or more of the following features may be included. The cross-reference target may include a portion of text within the hierarchically structured document. The hierarchically structured document may include a legal agreement.

The one or more components of the cross-reference may identify a hierarchical location of the cross-reference target within the hierarchically structured document. Determining the one or more components of the cross-reference may include identifying one or more ancestors of the cross-reference target within the hierarchically structured document. Determining the one or more components of the cross-reference may also include determining one or more components for each of the one or more ancestors of the cross-reference target.

The processor may be further configured for updating the cross-reference based upon, at least in part, a change in a hierarchical position of the cross-reference target within the hierarchically structured document.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Many documents use hierarchical structure to improve comprehension and to allow for internal cross-referencing. However, managing hierarchical structure while editing can present many challenges. For example, during editing, elements may be added at various hierarchical levels, new hierarchical levels may be created and/or removed, and elements may be moved among hierarchical levels. Such changes may impact portions of the document other than those being directly edited. The impacted portions of the document may need to be updated in response to the edits, which may complicate the editing process.

Consistent with an implementation, the present disclosure may facilitate the creation and management of internal cross-references within a document having a hierarchical organizational structure. For example, a cross-reference to a portion of the document may be created. The cross-reference may be automatically generated utilizing a plain language format consistent with one or more formatting styles that may be commonly used to reference other portions of the document. The plain language format may vary depending upon the type of document. In an embodiment, the cross-reference may be automatically generated based upon, at least in part, a location of the cross-referenced portion of the document within the hierarchical structure of the document. In one such embodiment, the cross-reference may be automatically updated when a hierarchical location of the cross-referenced portion of the document changes, e.g., during editing, revision, and the like, of the document.

In an example embodiment, a cross-reference target (e.g., the portion of the document being referenced) may be identified within the hierarchically structured document. Various components of the cross-reference may be determined based upon, at least in part, a hierarchical location of the cross-reference target within the hierarchically structured document. In an embodiment, the cross-reference components may form at least a portion of the basis for the plain language cross-reference. Further, in an embodiment, the cross-reference may be created based upon the determined components of the cross-reference. As such, in some embodiments, the cross-reference may include a dynamic element, e.g., which may be based upon, at least in part, the actual location of the cross-reference target within the document. In the event that the location of the cross-reference target within the hierarchically structured document changes, the cross-reference may be updated to reflect the changed location of the cross-reference target. Various additional and/or alternative features and aspects of the present disclosure will be described in detail below.

Figure 1:
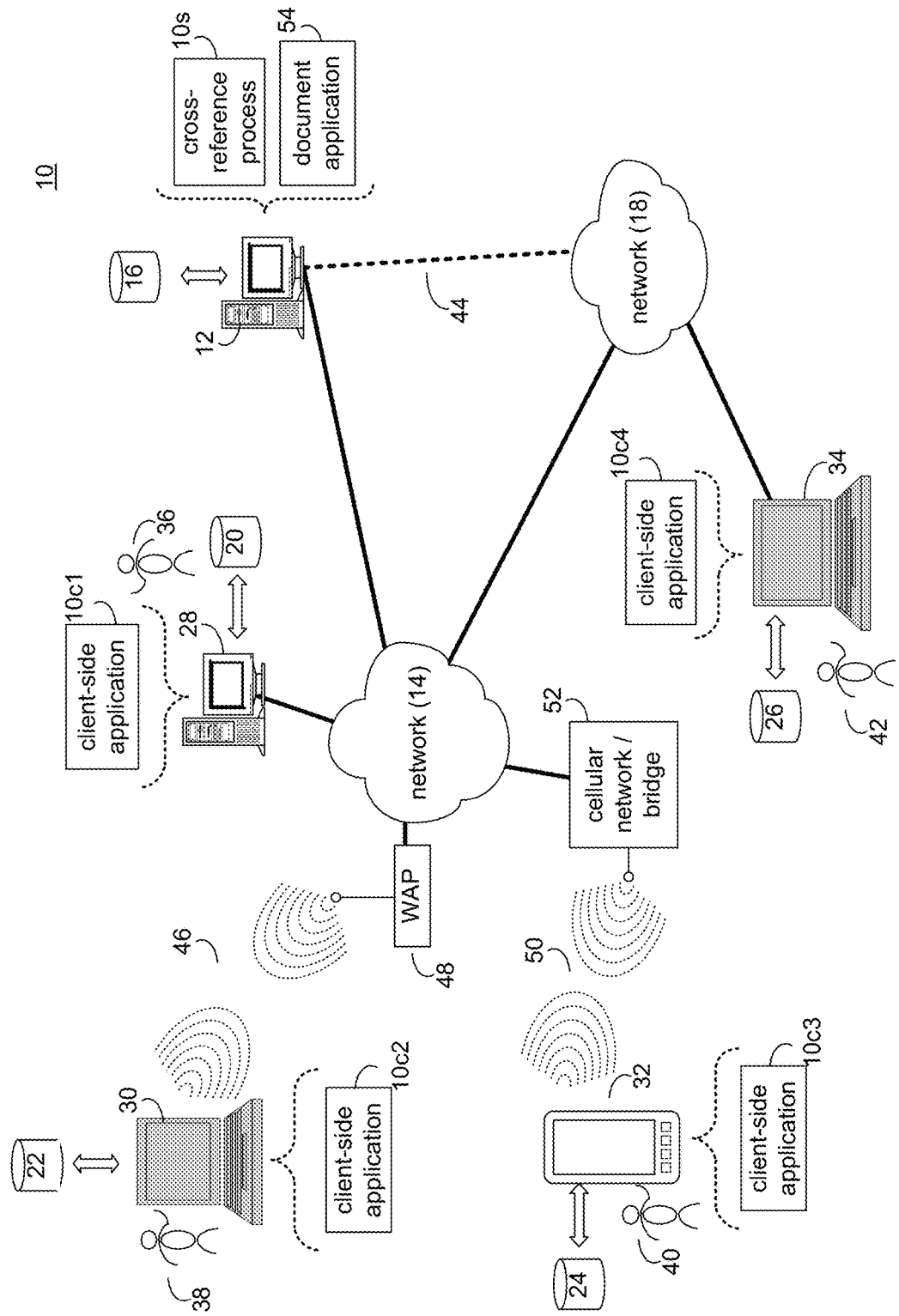
FIG. 1 is a diagrammatic view of a distributed computing network including a computing device that executes a cross-reference process according to an implementation of the present disclosure.

Referring to FIG. 1, there is shown cross-reference process 10. For the following discussion, it is intended to be understood that cross-reference process 10 may be implemented in a variety of ways. For example, cross-reference process 10 may be implemented as a server-side process, a client-side process, or a server-side/client-side process.

For example, cross-reference process 10 may be implemented as a purely server-side process via cross-reference process 10s. Alternatively, cross-reference process 10 may be implemented as a purely client-side process via one or more of client-side application 10c1, client-side application 10c2, client-side application 10c3, and client-side application 10c4. Alternatively still, cross-reference process 10 may be implemented as a server-side/client-side process via server-side cross-reference process 10s in combination with one or more of client-side application 10c1, client-side application 10c2, client-side application 10c3, and client-side application 10c4. In such an example, at least a portion of the functionality of cross-reference process 10 may be performed by cross-reference process 10s and at least a portion of the functionality of cross-reference process 10 may be performed by one or more of client-side application 10c1, 10c2, 10c3, and 10c3.

Accordingly, cross-reference process 10 as used in this disclosure may include any combination of cross-reference process 10s, client-side application 10c1, client-side application 10c2, client-side application 10c3, and client-side application 10c4.

Figure 2:
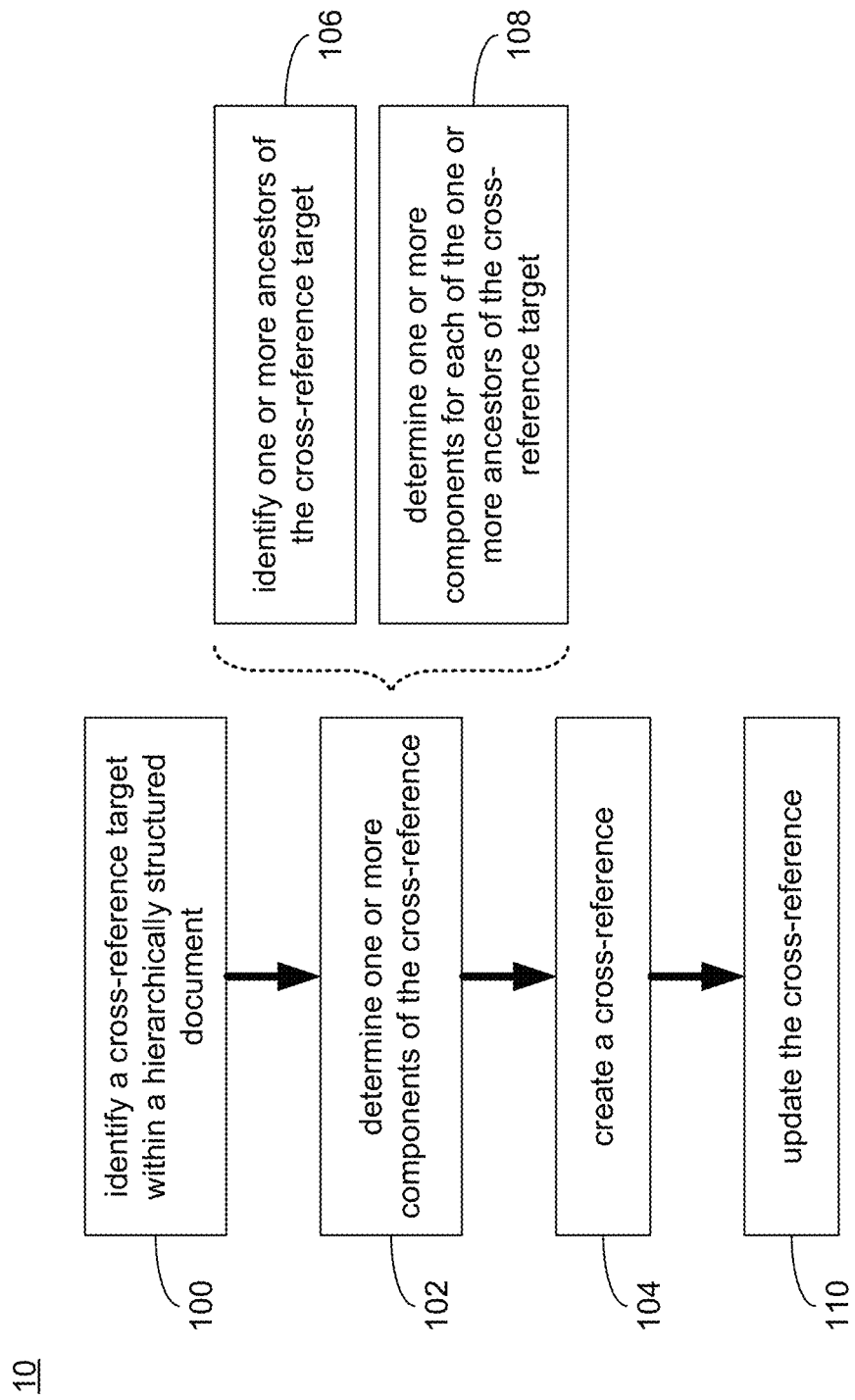
FIG. 2 is a flowchart of the cross-reference process of FIG. 1, according to an implementation of the present disclosure.

Referring also to FIG. 2, and as will be discussed in greater detail below, cross-reference process 10 may identify 100 a cross-reference target within a hierarchically structured document. Cross-reference process 10 may also determine 102 one or more components of the cross-reference based upon, at least in part, a hierarchical location of the cross-reference target within the hierarchically structured document. Cross-reference process 10 may further create 104 a cross-reference based upon, at least in part, the components for the cross-reference.

Cross-reference process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of cross-reference process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to, one or more of a word processor, a text editor, a web browser, or a specialized application (e.g., an application running on a mobile platform). The instruction sets and subroutines of client-side application 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, personal computer 28, laptop computer 30, mobile computing device 32, notebook computer 34, a netbook computer (not shown), a server computer (not shown), a gaming console (not shown), a data-enabled television console (not shown), and a dedicated network device (not shown). Client electronic devices 28, 30, 32, 34 may each execute an operating system.

Users 36, 38, 40, 42 may access cross-reference process 10 directly through network 14 or through secondary network 18. Further, cross-reference process 10 may be accessed through secondary network 18 via link line 44.

The various client electronic devices (e.g., client electronic devices 28, 30, 32, 34) may be directly or indirectly coupled to network 14 (or network 18). For example, personal computer 28 is shown directly coupled to network 14. Further, laptop computer 30 is shown wirelessly coupled to network 14 via wireless communication channels 46 established between laptop computer 30 and wireless access point (WAP) 48. Similarly, mobile computing device 32 is shown wirelessly coupled to network 14 via wireless communication channel 50 established between mobile computing device 32 and cellular network/bridge 52, which is shown directly coupled to network 14. WAP 48 may be, for example, an IEEE 802.11a, 802.11b, 802.11g, 802.11n, Wi-Fi, and/or Bluetooth device that is capable of establishing wireless communication channel 46 between laptop computer 30 and WAP 48. Additionally, personal computer 34 is shown directly coupled to network 18 via a hardwired network connection.

In some embodiments, cross-reference process 10 may communicate with, interact with, and/or include a component or module of a document application (e.g., document application 54). A document application (e.g., document application 54) may generally facilitate the creation and/or editing of a document having a hierarchical structure. Document application 54 may provide various additional and/or alternative functionality, such as sharing of documents, version control, etc. In some embodiments, document application 54 may include a word processing application and/or a text editing application that may allow the creation, editing, and/or management of a document having a hierarchical structure. In some embodiments, document process 54 may include a custom application. An example of a document process that allows the creating, editing, and/or management of a document having a hierarchical structure is described in U.S. Patent Application Publication No. 2013/0019164, entitled "System and Method for Processing Document," published on Jan. 17, 2013, the entire disclosure of which is incorporated herein by reference.

In an embodiment, the instruction sets and subroutines of document application 54 may be stored, e.g., on storage device 16 associated with server computer 12, which executes document application 54, and/or another suitable storage device. Further, users (e.g., one or more of users 36, 38, 40, 42) may access document application 54 in order to create, edit, manage or otherwise interact with a document having a hierarchical structure. The users may access document application 54 via one or more suitable applications, such as client side applications 10c1-10c4 (e.g., which may include a web browser, a client document application, or another application) and/or via a different application (not shown). Additionally, while document application 54 is depicted as a server application that may be remotely accessed by one or more users, in an embodiment, the document application may be a stand-alone application that may execute directly on a client electronic device (such as a personal computer, notebook computer, etc.). In such an implementation, users may directly access the document application on the client electronic device.

As generally discussed above, a portion and/or all of the functionality of cross-reference process 10 may be provided by one or more of client side applications 10c1-10c4. For example, in some embodiments cross-reference process 10 (and/or client-side functionality of cross-reference process 10) may be included within and/or interactive with client-side applications 10c1-10c4, which may include client side electronic communication applications, web browsers, or another application. Various additional/alternative configurations may be equally utilized.

As generally discussed above with reference to FIG. 2, cross-reference process 10 may identify 100 a cross-reference target within a hierarchically structured document. Cross-reference process 10 may also determine 102 one or more components of the cross-reference based upon, at least in part, a hierarchical location of the cross-reference target within the hierarchically structured document. Cross-reference process 10 may further create 104 a cross-reference based upon, at least in part, the components for the cross-reference.

Figure 3:
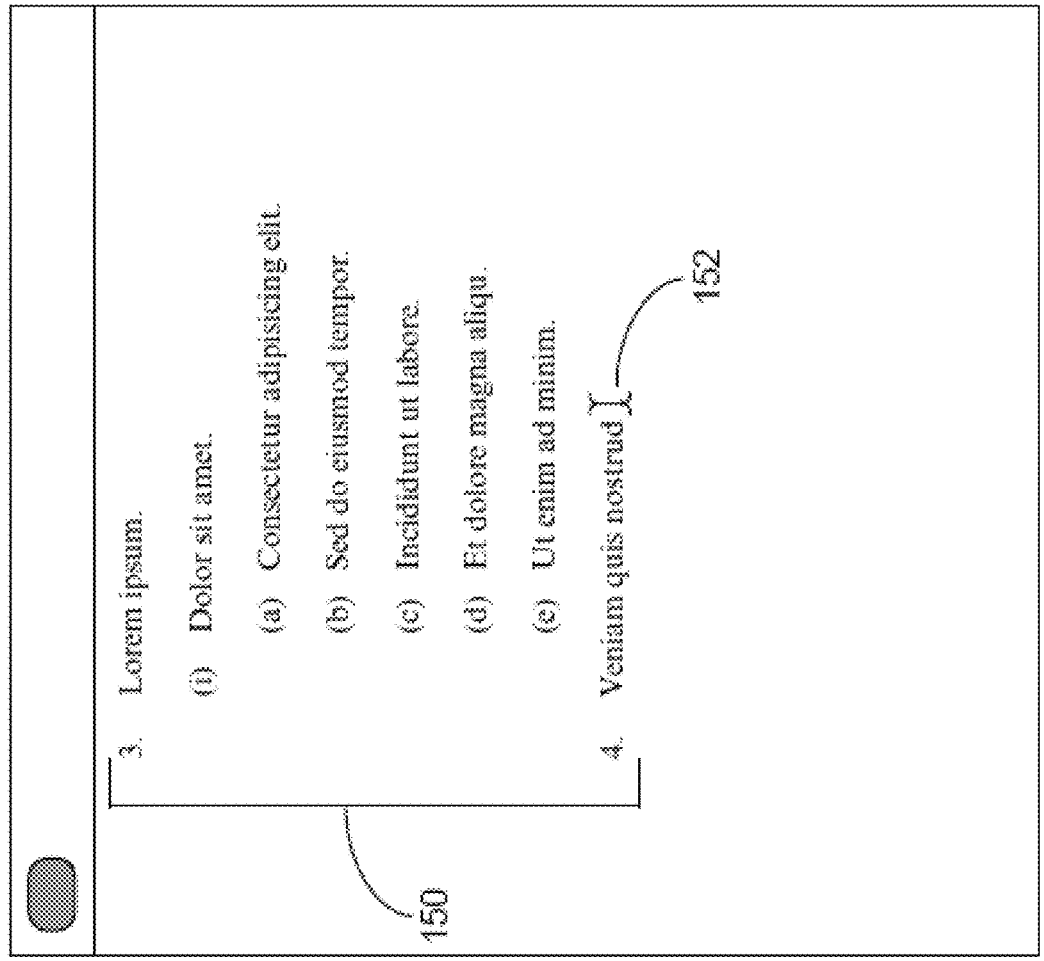
FIG. 3 is a diagrammatic view of an example of a cross-reference process according to an illustrative embodiment.

For example, and referring to FIG. 3, a user (e.g., user 36) may access a document (e.g., document 150) via document process 54. Document 150 may include a hierarchically structured document. In an embodiment, the hierarchically structured document may include a legal agreement. However, it will be appreciated that various other documents may include a hierarchical structure, e.g., documents which may include sections and subsections, etc. In an embodiment, a user may indicate a location (e.g., location 152) within document 150 where a cross-reference to another portion of the document is desired. For example, the user may select (e.g., using a pointing device such as trackpad and an onscreen pointer, not shown) a location within the text of document 150 where the user would like to insert a cross-reference to another portion of document 150.

Figure 4:
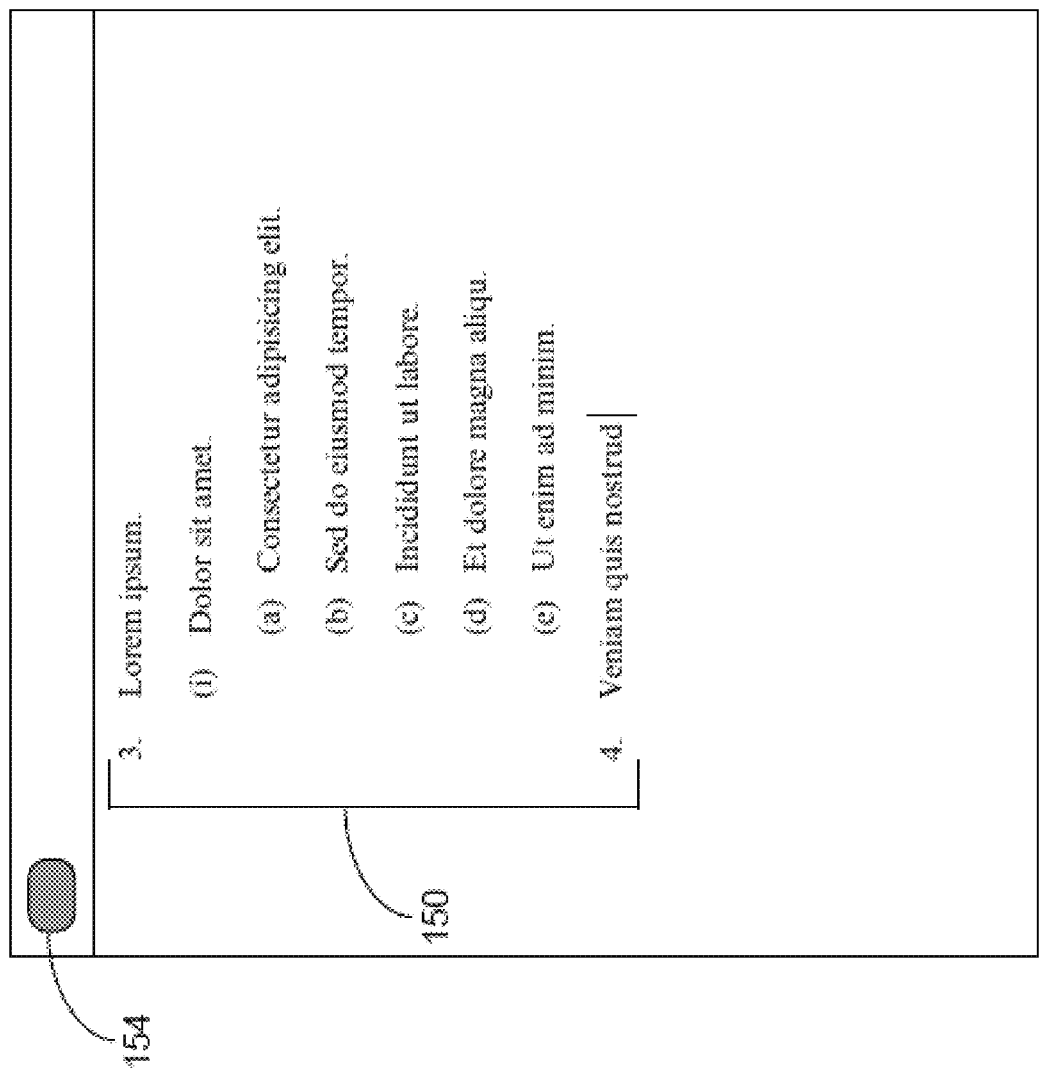
FIG. 4 is a diagrammatic view of an example of a cross-reference process according to an illustrative embodiment.

Referring also to FIG. 4, in an embodiment, after having selected a location within document 150 where the user would like to insert a cross-reference to another portion of document 150, the user may invoke a cross-reference request, e.g., by clicking (using an onscreen pointer and a pointing device) "cross-reference" button 154. In response to the user clicking cross-reference button 154, cross-reference process 10 may receive a request to create a cross-reference at the chosen location within document 150. It will be appreciated that the order in which cross-reference process may receive the request to create the cross-reference and may receive the desired location at which to insert the cross-reference may vary. Further, while particular user interfaces and examples may be described, it will also be appreciated that various user interfaces and/or command entry configurations may be utilized.

Figure 5:
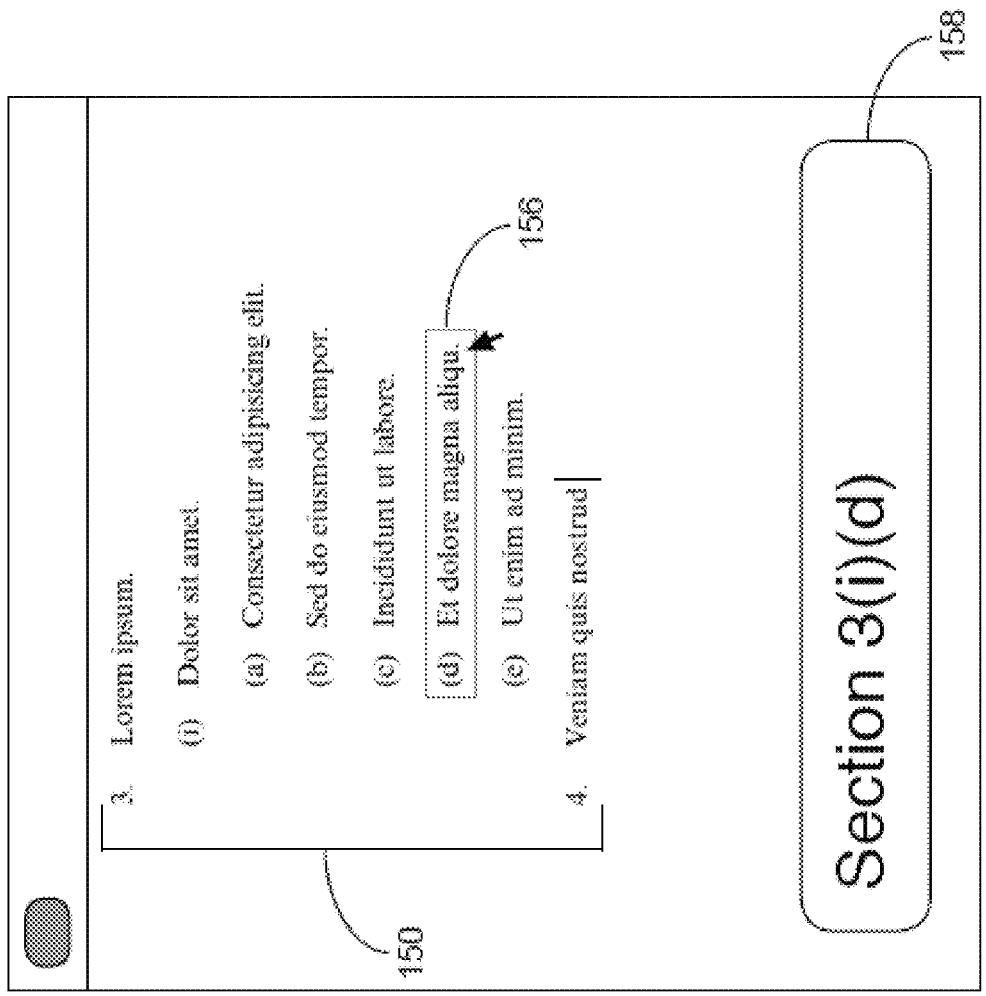
FIG. 5 is a diagrammatic view of an example of a cross-reference process according to an illustrative embodiment.

Cross-reference process 10 may identify 100 a cross-reference target within a hierarchically structured document. For example, the cross-reference target may include a portion of text, or another component, within the hierarchically structured document to which the cross-reference refers. In an embodiment in which the hierarchically structured document may include a legal agreement, the cross-reference target may include a provision, proviso, or other item that can be cross-referenced. With reference to FIG. 5, in an embodiment, the user may navigate (e.g., by scrolling or otherwise navigating through document 150) to the desired portion of the document to be cross-referenced (i.e., navigate to the location of the cross-reference target). The user may select the desired cross-reference target (e.g., by hovering an onscreen pointer 156 over the desired portion of document 150). Cross-reference process 10 may identify 100 the cross-reference target within the hierarchically structured document in response to the user clicking (or otherwise indicating) the desired portion of document 150 to be cross-referenced. For example, in FIG. 5 the identified cross-reference target may include Section 3(i)(d).

While in the illustrated example the identified cross-reference target may include Section 3(i)(d) of document 150, in an embodiment, the particular presentation of the cross-reference target (e.g., Section 3(i)(d) instead of Clause C.1.4) may be based upon a determined style schema applied to document 150 (and/or applied to the portion of document 150 included the cross-reference target). In an embodiment, the cross-reference target may include the actual text, or portion, of document 150 that is currently indicated by Section 3(i)(d), rather than the indicator Section 3(i)(d). For example, the cross-reference target may include an index, and the current location indicator (e.g., Section 3(i)(d)) may be applied to the index based upon, at least in part, the current hierarchical arrangement of document 150. In an embodiment, identifying 100 a cross-reference target may include determining an identifier of the portion of the document in a hierarchy map of document 150.

Given that document 150 is a hierarchically structured document, the cross-reference target may include one or more hierarchical ancestors (an "ancestor") and/or one or more hierarchical descendants (a "descendant"). An ancestor may include a portion of the document that lies in the same branch of the hierarchical structure of the document, but at a senior hierarchical level. Similarly, a descendant may include a portion of the document that lies in the same branch of the hierarchical structure of the document, but at a junior hierarchical level. The ancestors of the cross-reference target may also be identified as targets. For example, because the ancestors of a cross-reference target may, at least in part, determine a hierarchical location of the cross-reference target within the document, the ancestors of the cross-reference target may be considered in creating the cross-reference.

Within document 150, the cross-reference target, and the ancestors and descendants of the cross-reference target (all of which may generally be referred to as "targets") may be variously referred to as sections, subsections, paragraphs, as well as various other similar terminology, that may provide a plain language indication of the hierarchical structure and location of the various targets within that hierarchical structure. In some embodiments, however, each of the targets may include an index, or other indicator, that indicates the relative position and/or relationship of each target (e.g., each portion of the document). The plain language terminology (e.g., section, subsection, paragraph, etc.), numbering, and/or other indicators may be applied to the targets based upon, at least in part, a style or format schema. In the illustrated example in which the cross-reference target is 3(i)(d), paragraph (i) may be an ancestor of item (d), and section 3 may be an ancestor of paragraph (i). The numbering schema 3(i)(d) may be applied to the relevant portions of the document based upon an index, or other indicator, that the portion of the document identified as item (d) is a descendant of the portion of the document identified as paragraph (i), which is, itself, a descendant of the portion of the document identified as section 3.

Cross-reference process 10 may also determine 102 one or more components of the cross-reference based upon, at least in part, a hierarchical location of the cross-reference target within the hierarchically structured document. In general, targets (e.g., the cross-reference target as well as any ancestor or descendant targets) may create, or give rise to, and manage cross-reference components (e.g., which may also be referred to as "components"). In an embodiment, a component may provide a plain language description of the relative hierarchical position of the associated target (e.g., of the cross-reference target and the ancestor targets of the cross-reference target). The plain language description may be based upon, at least in part, the style or format schema utilized for the relevant portion of the document. In an embodiment, the one or more components of the cross-reference may identify a hierarchical location of the cross-reference target within the hierarchically structured document. In the illustrated example, components of the cross-reference target may include "Section 3," "paragraph (i)," and "clause d".) Various other nomenclatures may be utilized depending, at least in part, upon the style or format schema utilized.

In some embodiments, components may be categorized into two or more types: a definite component and a prefixed component. A definite component may contain information only about the target with which the component is associated. A prefixed component may contain information about the target with which the component is associated, and may also include information about the ancestors of the target with which the prefixed component is associated. In an embodiment, each target may create, or give rise to, and manage either a definite component or a prefixed component, but not both. It will be appreciated that different, and/or additional, types or varieties of components may be implemented.

In an embodiment, components may be categorized as either a definite component or a prefixed component because each type of component may generally be cross-referenced differently in legal agreements. It will be appreciated that for documents other than legal agreements, different types of components may be implemented, and/or only a single type of component may be utilized. For example, in the illustrative context of a legal agreement, provisos, definitions, and introductory sections (such as recitals) may be targets that give rise to a definite component. Similarly, provisions and list items may be targets the give rise to prefixed components. For example, targets such as provisos and definitions that give rise to a definite component may typically be cross-referenced using language such as "the proviso to Section 1," or "the definition of a Defined Term in Section 1." Such targets would typically not be cross-referenced using language such as "Section 1 (proviso)," or "Section 1 (Defined Term) (Definition)." By contrast, targets such as provisions and list items, which may give rise to prefixed components, may typically be cross-referenced using language such as "Section 3.1(d)(a)," or alternative language such as "clause (a) of Section 3.1(d)," or "clause (a) or subsection (d) of Section 3.1." Consistent with the foregoing, a definite component may often include a definite article (e.g., "the") and may not be concatenated. Prefixed components may typically not include a definite article and may often be concatenated (or expanded). In some instances, the prefix of a prefixed component may be blank. For example, in a list of cross-references such as "Section 1.1(a) and (b)," both "Section 1.1(a)" and "(b)" may be prefixed components, even though "Section 1.1(a)" includes the prefix "Section" while the prefixed component "(b)" does not include a prefix. In some embodiments, components may be provided with separators, which may include words such as "of," "to," or "in", which may separate the end of one component from the beginning of another in a cross-reference.

In an embodiment, determining 102 the one or more components of the cross-reference may include identifying 106 one or more ancestors of the cross-reference target within the hierarchically structured document. For example, as described above, the location of the cross-reference target within the hierarchically structured document may be based upon, at least in part, the hierarchical relationship between the cross-reference target and other portions of the document. As such, determining 102 one or more components of the cross-reference may include identifying 106 one or more ancestors of the cross-reference target, e.g., which may thereby provide the context by which the location of the cross-reference target may be identified. Continuing with the above illustrative example, 'Section 3(i)' and 'paragraph (i) of section 3' provide context for hierarchical location of clause (d) within paragraph (i) of Section 3.

Determining 102 the one or more components of the cross-reference may include determining 108 one or more components for each of the one or more ancestors of the cross-reference target. For example, and as generally described above, the location of a cross-reference target within a hierarchically structured document may be specified, at least in part, based upon the relationship of the cross-reference target relative to its ancestors. As such, components for the ancestors of the cross-reference target may provide the context for the cross-reference. For example, clause (d) (e.g., which may include the direct component of the cross-reference target) may become meaningful when it is identified as being clause (d) of paragraph (i) of Section 3. In this example, "paragraph (i)" may be a component associated with a direct ancestor of the cross-reference target, and "Section 3" may be a component associated with the direct ancestor of "paragraph (i)," and therefore is a second order ancestor of the cross-reference target "clause (d)".

An illustrative example of an algorithm for determining 102 one or more components associated with a cross-reference target is provided below in pseudocode (Pseudocode 1). It will be appreciated that the features and operation of cross-reference process 10 may be implemented in various additional and/or alternative manners. As such, the illustrative pseudocode herein should not be construed as a limitation of the present disclosure.

| Pseudocode 1 |
| --- |
| 1 let targets be an empty list |
| 2 let truncationAmount be the number of targets to exclude from the cross-reference |
| 3 add this target's ancestors to targets |
| 4 remove truncationAmount targets from the end of targets |
| 5 prepend this target to targets |
| 6 let additionalPrefixedComponentCount be the preferred number of prefixed cross-reference components |
| 7 if additionalPrefixedComponentCount is greater than 0 |
| 8    if the last (most senior) target in targets produces prefixed components |
| 9       decrement additionalPrefixedComponentCount |
| 10    if additionalPrefixedComponentCount is greater than 0 |
| 11       let foundPrefixedComponentTarget be a boolean, and set it to NO |
| 12       for each target in targets |
| 13          if target produces prefixed components |
| 14             set foundPrefixedComponentTarget to YES |
| 15          else if foundPrefixedComponentTarget is YES |
| 16             decrement additionalPrefixedComponentCount |
| 17             if additionalPrefixedComponentCount is 0 |
| 18                exit this for-loop |
| 19             set foundPrefixedComponentTarget to NO |
| 20 let components be an empty list |
| 21 let targetIndex be 0 |
| 22 if additionalPrefixedComponentCount is greater than 0 |
| 23    for each target in targets |
| 24       increment targetIndex |
| 25       if target produces prefixed components |
| 26          add a prefixed component with target target to components |
| 27          decrement additionalPrefixedComponentCount |
| 28          if additionalPrefixedComponentCount is 0 |
| 29             exit this for-loop |
| 30       else |
| 31          add a definite component with target target to components |
| 32 let prefixedComponentTarget be nil |
| 33 for each target in targets starting at the targetIndex |
| 34    if target produces prefixed components |
| 35       if prefixedComponentTarget is nil |
| 36          let prefixedComponentTarget be target |
| 37    else |
| 38       if prefixedComponentTarget is not nil |
| 39          add a prefixed component with target prefixedComponentTarget to components |
| 40          let prefixedComponentTarget be nil |
| 41       add a definite component with target target to components |
| 42 if prefixedComponentTarget is not nil |
| 43    add a prefixed component with target prefixedComponentTarget to components |

In the preceding example Pseudocode 1, lines 1-5 may generally perform subroutine 1: create a list of the various targets associated with the cross-reference (e.g., which may include the cross-reference target and at least a portion of the ancestors of the cross-reference target). In some embodiments, the created list may be truncated, for example, based upon one or more preferences that may be defined. Lines 6-19 of the illustrative pseudocode may generally perform subroutine 2: determine how many prefixed components should be added to the list of components beyond the those prefixed components that will be added by default operation of the process. In an embodiment, the number of prefixed components to be added by lines 6-19 may be based upon, at list in part, system default, user preference, or the like. Subroutine 2 may, at least in part, determine the number of prefixed components to be added in subroutine 3 below.

Lines 20-31 of the illustrative pseudocode may generally perform subroutine 3: add additional prefixed components (e.g., as determined by lines 6-19) to the list of components. Further, lines 32-43 of the illustrative pseudocode may generally perform subroutine 4: add prefixed components (if possible) and a definite component (if necessary) to the list of components. As used herein, (1) "subroutine 1," "subroutine 2," "subroutine 3," and "subroutine 4" are intended to indicate sets of operations or processes that may be performed by the example Pseudocode 1, and (2) the "algorithm" is intended to indicate all operations and processes that may be performed by the example Pseudocode 1.

Subroutine 2 and subroutine 3 may depend upon preferences (e.g., user preferences, system settings, or the like). In some situations, depending upon the defined preferences, subroutine 2 and subroutine 3 may not have any effect on the outcome of the determination 102 of the components associated with the cross-reference by the illustrative pseudocode. Therefore, for the purpose of simplifying explanation of the operation of the forgoing illustrative pseudocode, the operation of subroutine 1 and subroutine 4 are explained first, with the operation of subroutine 2 and subroutine 3 being explained subsequently.

As discussed above, subroutine 1 may create a list of targets (e.g., which may include the cross-reference target as well as any relevant ancestors of the cross-reference target). For example, if the cross-reference target is "i" in the example:

| | |
|---|---|
| 1 | 1. Defined Terms. |
| a | (a) Defined Terms. |
| DT | "Defined Term" means: |
| i | (i) lorem ipsum; |

The list of targets associated with the cross-reference may include i, DT, a, and 1. Optionally, the list of targets can be truncated from the end. Truncating the list of target may be useful, for example, for cross-referencing defined terms, or targets whose ancestors include a defined term. Continuing with the example, it may be desirable to provide the plain language cross-reference as "clause (i) of the definition of Defined Term," rather than "clause (i) of the definition of Defined Term in Section 1(a)." In order to create the preferred cross-reference, the cross-reference process (e.g., via the illustrative pseudocode, or other operations) may remove targets a and 1 from the end of the list of targets, thereby providing a truncated list of targets.

Subroutine 4 may add components to a list of components created for the targets associated with the cross-reference (e.g., for the cross-reference target and for any relevant ancestor targets of the cross-reference target, which may all generally be referred to as "targets"). The operation and/or outcomes of subroutine 4 may be based upon, at least in part, the type of component (e.g., prefixed component or definite component) produced by the targets. For example, in a situation in which only prefixed components are produced, lines 34-36 of the algorithm may essentially have no effect, and the algorithm may end at line 43 by adding one prefixed component to the list of components. The one prefixed component added to the list of prefixed components may be the prefixed component produced by the first target in the list of targets (e.g., which may be the cross-reference target itself).

In a situation in which the list of targets includes only targets that produce a definite component, then line 41 of the algorithm may add the definite components produced by each of these targets to the list of components. The algorithm may essentially end when line 41 runs for the last target in the list of targets.

If the list of targets begins with one or more targets that produce a prefixed component, and then includes a mix of targets that each produce a prefixed component and targets that each produce a definite component, lines 34-36 may run until the algorithm finds a target that produces a definite component. While this may essentially have no effect, note that at line 36, the algorithm may save the first target in the list of targets (and this target produces a prefixed component). Once the algorithm finds a target that produces a definite component, the algorithm may add two components to the list of components: (1) the prefixed component produced by the saved target, and (2) the definite component produced by current target. The algorithm may repeat this process for each target in the list of targets. If the last target in the list of targets produces a definite component, then the algorithm may essentially end by adding this definite component to the list of components at line 41. If the last target in the list of targets produces a prefixed component, then the algorithm may end by adding a prefixed component (e.g., which may specifically be the prefixed component produced by the target after the last target that produces a definite component) to the list of components at line 43.

In a situation in which the list of targets begins with targets that produce a definite component, and then includes a mix of targets that each produce a prefixed component and targets that each produce a definite component, the algorithm (at line 41) may add the definite components produced by the targets to the list of components until the algorithm finds a target that produces a prefixed component. Once the algorithm finds a target that produces a prefixed component, the algorithm may proceed as if the list of targets began with targets that produce a prefixed component.

As generally described above, subroutine 2 and subroutine 3 may determine the number of any additional prefixed components that should be added to the list of components, and may add any additional prefixed components to the list of components, based upon a number of additional components calculated by subroutine 2. For example, instead of "Section 3.1(d)(a)," the preferred plain language cross-reference may be "clause (a) of Section 3.1(d)," or "clause (a) of subsection (d) of Section 3.1." The algorithm may facilitate such a plain language cross-reference via subroutine 2 and subroutine 3. For example, in subroutine 2, the algorithm may calculate the number of additional prefixed components to be added beyond those that might have been added anyway in subroutine 4. Generally, this number of additional prefixed components may include (1) a preferred number of prefixed components, minus (2) the number of targets in the list of targets that produce a definite component. The number of additional prefixed components may be based upon, at least in part, a user preference or system setting. In an embodiment, lines 8 and 9 may represent a simple adjustment for the general case. For example, if, in the illustrative contract language, a cross-reference to a is desired, and only a single component is desired (i.e., "Section 1(a)"), the variable additionalPrefixedComponentCount may begins as the preference 1. The preference may be decremented to 0 at line 8 (the most senior target in this example, 1, is a provision, and thus may produce a prefixed component). In other words, the result may be zero additional prefixed components, which is the desired result.

Subroutine 3 may add the additional prefixed components to the list of components based upon, at least in part, the number calculated in subroutine 2. Subroutine 3 may also include a mechanism (e.g., the targetIndex) to ensure that components added in subroutine 3 are not added again in subroutine 4.

For the purpose of facilitating understanding of the operation of determining 102 one or more components associated with the cross-reference target consistent with the illustrative pseudocode, example implementations are described below. These examples are intended for the purpose of illustration, and should not be construed as a limitation on the present disclosure.

Example 1

The following Example 1 relates to creating a cross-reference to the following hierarchically structured document portion, in which the portion to be cross-referenced is "1. The Merger."

| 1 | 1. | The Merger. | [Cross-reference this] |
|---|----|-------------|------------------------|
|   |    | (a) The Closing. |                   |

Subroutine 1 of the algorithm creates a list of targets associated with the desired cross-reference. In this example, at line 2, truncationAmount is set to 0. Line 3 adds the ancestors of 1 (the cross-reference target) to targets. Because 1 has no ancestors, the algorithm proceeds to line 4. In the illustrative example, line 4 removes truncationAmount targets from the end of targets. Because truncationAmount is 0, this line has no effect, and the algorithm proceeds to line 5. At line 5, the algorithm prepends 1 (the cross-reference target) to targets. Thus, at line 5, targets contains 1.

Subroutine 2 of the algorithm determines additional prefixed components to be added to components (i.e., the listing of determined 102 components). Continuing with the example, at line 6, additionalPrefixedComponentCount is set to 1. Note that additionalPrefixedComponentCount derives from a preferred number of prefixed components. Thus, if additionalPrefixedComponentCount starts out as 1, components should include one prefixed component when the algorithm finishes, if possible. At line 7, the algorithm checks whether additionalPrefixedComponentCount is greater than 0. Because additionalPrefixedComponentCount is 1, the algorithm proceeds to line 8. At line 8, the algorithm determines whether the last (most senior) target in targets produces a prefixed component. The last (and only) target in targets is 1, in this example. Because 1 is a provision, it produces a prefixed component. Thus, the algorithm proceeds to line 9. At line 9, additionalPrefixedComponentCount is decremented from 1 to 0, and the algorithm proceeds to line 10. At line 10, additionalPrefixedComponentCount is checked to determine whether it is greater than 0. Because additionalPrefixedComponentCount is 0, the algorithm proceeds to line 22.

Subroutine 3 of the algorithm adds additional prefixed components to components. For example, at line 22, additionalPrefixedComponentCount is checked to determine whether it is greater than 0. Because additionalPrefixedComponentCount is still 0, the algorithm proceeds to line 33.

Subroutine 4 of the algorithm finishes adding components to components. At line 33, the algorithm enters a for-loop. Because targets contains only 1, this for-loop runs for one iteration. During this iteration, target is 1 (the cross-reference target). At line 34, the algorithm checks whether 1 produces a prefixed component. Because 1 is a provision, it produces a prefixed component. Thus, the algorithm proceeds to line 35. At line 35, the algorithm checks whether prefixedComponentTarget is nil. Because this is so (set at line 32), the algorithm sets prefixedComponentTarget to 1 at line 36. The algorithm then exits the for-loop and proceeds to line 42. At line 42, the algorithm checks whether prefixedComponentTarget is not nil. Because prefixedComponentTarget is 1 (not nil), the algorithm proceeds to line 43. At line 43, a prefixed component with 1 as its target is added to components. Thus, components contains one prefixed component with 1 as its target. At this point, the algorithm is done.

Example 2

The following Example 2 relates to creating a cross-reference to the following hierarchically structured document portion, in which the portion to be cross-referenced is "(A) Force Majeure."

| 1 | 1. | The Merger. | |
|---|----|-------------|---|
| a |    | (a) The Closing. | |
| i |    |     | (i) Effective Time. | |
| A |    |     |     | (A) Force Majeure. | [Cross-reference this] |

To illustrate how different values of additionalPrefixedComponentCount affect the algorithm, three values are used in this example, namely 1, 2, and 3. Note that additionalPrefixedComponentCount derives from a preferred number of prefixed components. Thus, if additionalPrefixedComponentCount starts out as 2, components (i.e., the listing of determined 102 components) should include two prefixed components when the algorithm finishes, if possible.

The value additionalPrefixedComponentCount has no effect on the list of targets created in subroutine 1 of the algorithm. Therefore, in this example, subroutine 1 is the same for all values of additionalPrefixedComponentCount. As before, subroutine 1 creates a list of targets associated with the desired cross-reference. In this example, at line 2, truncationAmount is set to 0. Line 3 adds A's ancestors (i.e., the ancestors of the cross-reference target, namely i, a, and 1) to targets. Thus, at line 3, targets contains i, a, and 1. Line 4 removes truncationAmount targets from the end of targets. Because truncationAmount is 0 in this example, this line has no effect, and the algorithm proceeds to line 5. At line 5, the algorithm prepends A to targets. Thus, at line 5, targets contains A, i, a, and 1.

The following description of Example 2 contemplates a situation in which additionalPrefixedComponentCount starts at 1. Subroutine 2 of the algorithm determines additional prefixed components to be added to components (i.e., the listing of determined 102 components). At line 6, additionalPrefixedComponentCount is set to 1 (for the purposes of this description). At line 7, the algorithm checks whether additionalPrefixedComponentCount is greater than 0. In this example, because additionalPrefixedComponentCount is 1, the algorithm proceeds to line 8. At line 8, the algorithm checks whether the last (most senior) target in targets produces a prefixed component. The last target in targets is 1. Because 1 is a provision, it produces a prefixed component. Thus, the algorithm proceeds to line 9. At line 9, the algorithm decrements additionalPrefixedComponentCount from 1 to 0, and then proceeds to line 10. At line 10, the algorithm checks whether additionalPrefixedComponentCount is greater than 0. Because additionalPrefixedComponentCount is 0, the algorithm proceeds to line 22.

Subroutine 3 adds additional prefixed components to components. At line 22, the algorithm again checks whether additionalPrefixedComponentCount is greater than 0. Because additionalPrefixedComponentCount is still 0, the algorithm proceeds to line 33.

Subroutine 4 of the algorithm finishes adding components to components. At line 33, the algorithm enters a for-loop. This for-loop iterates over each target in targets starting at the targetIndex (set to 0 at line 21). The targetIndex of A is 0, i is 1, a is 2, and 1 is 3. During iteration 1 of the for-loop, target is A. At line 34, the algorithm checks whether A produces a prefixed component. Because A is a provision, it produces a prefixed component. Thus, the algorithm proceeds to line 35. At line 35, the algorithm checks whether prefixedComponentTarget is nil. Because this is so (set at line 32), the algorithm sets prefixedComponentTarget to A at line 36. During iterations 2-4, target is i, a, and 1, respectively. At line 34, the algorithm checks whether each of these targets produces a prefixed component. Because each is a provision, each produces a prefixed component. Thus, the algorithm proceeds to line 35. At line 35, the algorithm checks whether prefixedComponentTarget is nil. Because prefixedComponentTarget is A (not nil), these iterations ultimately have no effect. The algorithm then exits the for-loop and proceeds to line 42. At line 42, the algorithm checks whether prefixedComponentTarget is not nil. Because prefixedComponentTarget is A (not nil), the algorithm proceeds to line 43. At line 43, a prefixed component with A as its target is added to components. Thus, components contains one prefixed component with A as its target. At this point, the algorithm is done. As expected based on the initial value of additionalPrefixedComponentCount (1), components includes one prefixed component.

The following description of Example 2 contemplates a situation in which additionalPrefixedComponentCount starts at 2. As before, subroutine 2 of the algorithm determines additional prefixed components to be added to components (i.e., the listing of determined 102 components). At line 6, additionalPrefixedComponentCount is set to 2 (for the purposes of this description). At line 7, the algorithm checks whether additionalPrefixedComponentCount is greater than 0. As noted above, in this description of Example 2, additionalPrefixedComponentCount is 2. Therefore, the algorithm proceeds to line 8. At line 8, the algorithm checks whether the last (most senior) target in targets produces a prefixed component. The last target in targets is 1. Because 1 is a provision, it produces a prefixed component. Thus, the algorithm proceeds to line 9. At line 9, the algorithm decrements additionalPrefixedComponentCount from 2 to 1, and then proceeds to line 10. At line 10, the algorithm checks whether additionalPrefixedComponentCount is greater than 0. Because additionalPrefixedComponentCount is 1, the algorithm proceeds to line 12. At line 12, the algorithm enters a for-loop. Because there are four targets in targets, this for-loop runs for four iterations: first over A, then over i, then over a, and finally over 1. Except for the target at hand, each iteration is the same. At line 13, the algorithm checks whether each of these targets produces a prefixed component. Because each target is a provision, each produces a prefixed component. Thus, at line 14, the algorithm sets foundPrefixedComponentTarget to YES during each iteration. Thus, this for-loop ultimately has no effect. The algorithm exits the for-loop and proceeds to line 22.

Subroutine 3 of the algorithm adds additional prefixed components to components. At line 22, the algorithm checks whether additionalPrefixedComponentCount is greater than 0. Because additionalPrefixedComponentCount is 1, the algorithm proceeds to line 23. At line 23, the algorithm enters a for-loop. Ostensibly, this for-loop iterates over each target in targets. However, because of the way additionalPrefixedComponentCount affects the algorithm, this for-loop runs for only one iteration. During iteration 1, target is A. At line 24, the algorithm increments targetIndex from 0 to 1. At line 25, the algorithm checks whether A produces a prefixed component. Because A is a provision, it produces a prefixed component. Thus, at line 26, a prefixed component with A as its target is added to components; and at line 27, additionalPrefixedComponentCount is decremented from 1 to 0. At line 28, the algorithm checks whether additionalPrefixedComponentCount is 0. Because this is so, the algorithm exits the for-loop at line 29 and proceeds to line 33. At this point, components contains one prefixed component with A as its target.

Subroutine 4 of the algorithm finishes adding components to components. At line 33, the algorithm enters another for-loop. This for-loop iterates over each target in targets starting at the targetIndex (1). The targetIndex of A is 0, i is 1, a is 2, and 1 is 3. During iteration 1, target is i. At line 34, the algorithm checks whether i produces a prefixed component. Because i is a provision, it produces a prefixed component. Thus, the algorithm proceeds to line 35. At line 35, the algorithm checks whether prefixedComponentTarget is nil. Because this is so (set at line 32), the algorithm sets prefixedComponentTarget to i at line 36. During iterations 2 and 3, target is a and 1, respectively. At line 34, the algorithm checks whether each of these targets produces a prefixed component. Because each target is a provision, each produces a prefixed component. Thus, the algorithm proceeds to line 35. At line 35, the algorithm checks whether prefixedComponentTarget is nil. Because prefixedComponentTarget is i (not nil), these iterations ultimately have no effect. The algorithm exits the for-loop and proceeds to line 42. At line 42, the algorithm checks whether prefixedComponentTarget is not nil. Because prefixedComponentTarget is i (not nil), the algorithm proceeds to line 43. At line 43, a prefixed component with i as its target is added to components. Thus, components contains two components: (1) a prefixed component with A as its target, and (2) a prefixed component with i as its target. At this point, the algorithm is done. As expected based on the initial value of additionalPrefixedComponentCount (2), components includes two prefixed components.

The following description of Example 2 contemplates a situation in which additionalPrefixedComponentCount starts at 3. As before, subroutine 2 of the algorithm determines additional prefixed components to be added to components. Through line 23, the algorithm proceeds as if additionalPrefixedComponentCount was set to 2 instead of 3, except that the algorithm decrements additionalPrefixedComponentCount from 3 to 2 at line 9.

Subroutine 3 of the algorithm adds additional prefixed components to components. At line 22, the algorithm checks whether additionalPrefixedComponentCount is greater than 0. In this description of Example 2, additionalPrefixedComponentCount is 2. Therefore, the algorithm proceeds to line 23. At line 23, the algorithm enters a for-loop. Ostensibly, this for-loop iterates over each target in targets. However, because of the way additionalPrefixedComponentCount affects the algorithm, this for-loop runs for only two iterations. During iteration 1, target is A. At line 24, the algorithm increments targetIndex from 0 to 1. At line 25, the algorithm checks whether A produces a prefixed component. Because A is a provision, it produces a prefixed component. Thus, at line 26, the algorithm adds a prefixed component with A as its target to components; and at line 27, the algorithm decrements additionalPrefixedComponentCount from 2 to 1. At line 28, the algorithm checks whether additionalPrefixedComponentCount is 0. Because additionalPrefixedComponentCount is 1, this if-branch has no effect. During iteration 2, target is i. At line 24, the algorithm increments targetIndex from 1 to 2. At line 25, the algorithm checks whether i produces a prefixed component. Because i is a provision, it produces a prefixed component. Thus, at line 26, the algorithm adds a prefixed component with i as its target to components; and at line 27, the algorithm decrements additionalPrefixedComponentCount from 1 to 0. At line 28, the algorithm checks whether additionalPrefixedComponentCount is 0. Because this is so, the algorithm exits the for-loop at line 29 and proceeds to line 33. At this point, components contains two components: (1) a prefixed component with A as its target, and (2) a prefixed component with i as its target.

Subroutine 4 of the algorithm finishes adding components to components. At line 33, the algorithm enters another for-loop. This for-loop iterates over each target in targets starting at the targetIndex (2). The targetIndex of A is 0, i is 1, a is 2, and 1 is 3. During iteration 1, target is a. At line 34, the algorithm checks whether a produces a prefixed component. Because a is a provision, it produces a prefixed component. Thus, the algorithm proceeds to line 35. At line 35, the algorithm checks whether prefixedComponentTarget is nil. Because this is so (set at line 32), prefixedComponentTarget is set to a at line 36. During iteration 2, target is 1. At line 34, the algorithm checks whether 1 produces a prefixed component. Because 1 is a provision, it produces a prefixed component. Thus, the algorithm proceeds to line 35. At line 35, the algorithm checks whether prefixedComponentTarget is nil. Because prefixedComponentTarget is a (not nil), this iteration ultimately has no effect. The algorithm then exits the for-loop and proceeds to line 42. At line 42, the algorithm checks whether prefixedComponentTarget is not nil. Because prefixedComponentTarget is a (not nil), the algorithm proceeds to line 43. At line 43, a prefixed component with a as its target is added to components. Thus, components contains three components: (1) a prefixed component with A as its target, (2) a prefixed component with i as its target, and (3) a prefixed component with a as its target. At this point, the algorithm is done. As expected based on the initial value of additionalPrefixedComponentCount (3), components includes three prefixed components.

Example 3

The following Example 3 relates to creating a cross-reference to the following hierarchically structured document portion, in which the portion to be cross-referenced is "(b) exercitation ullamco laboris."

| 1 | 1. | Defined Terms. |
| a | | (a) Defined Terms. |
| DT | | "Defined Term" means: |
| i | | (i) lorem ipsum; |
| | | (A) dolor sit amet; |
| B | | (B) consectetur adipisicing elit; |
| | | (I) sed do eiusmod tempor; |
| II, pr | | (II) incididunt ut labore, provided, however, that (x) et |
| y | | dolore magna aliqua, (y) ut enim ad minim |
| | | (a) veniam quis |
| b | | nostrud (b) exercitation ullamco laboris. |

To illustrate how different values of additionalPrefixedComponentCount affect the algorithm, three values of additionalPrefixedComponentcount are used in this example, namely 1, 3, and 5. It should be noted that additionalPrefixedComponentCount derives from a preferred number of prefixed components. Thus, if additionalPrefixedComponentCount starts out as 3, components (i.e., the listing of determined 102 components) should include three prefixed components when the algorithm finishes, if possible.

The value additionalPrefixedComponentCount has no effect on the list of targets created in subroutine 1 of the algorithm. Therefore, subroutine 1 is the same for all values of additionalPrefixedComponentCount. Subroutine 1 of the illustrative algorithm creates a list of targets associated with the desired cross-reference. At line 2, for this example, truncationAmount is set to 2. Line 3 adds b's ancestors, namely y, pr, II, B, i, DT, a, and 1, to targets. Thus, at line 3, targets contains y, pr, II, B, i, DT, a, and 1. At line 4, the algorithm removes 2 (the truncationAmount) targets from the end of targets. Thus, at line 4, targets contains y, pr, II, B, i, and DT. At line 5, the algorithm prepends b to targets. Thus, at line 5, targets contains b, y, pr, II, B, i, and DT.

The first description of this Example 3 contemplates a situation in which additionalPrefixedComponentCount is set to 1. Subroutine 2 of the algorithm determines additional prefixed components to be added to components (i.e., the listing of determined 102 components). At line 6, additionalPrefixedComponentCount is set to 1. At line 7, the algorithm checks whether additionalPrefixedComponentCount is greater than 0. In this description, because additionalPrefixedComponentCount is 1, the algorithm proceeds to line 8. At line 8, the algorithm checks whether the last (most senior) target in targets produces a prefixed component. The last target in targets is DT. Because DT is a defined term, it produces a definite component, not a prefixed component. Thus, the algorithm proceeds to line 10. At line 10, the algorithm checks whether additionalPrefixedComponentCount is greater than 0. Because additionalPrefixedComponentCount is 1, the algorithm proceeds to line 12. At line 12, the algorithm enters a for-loop. During iteration 1, target is b. At line 13, the algorithm checks whether b produces a prefixed component. Because b is a list item, it produces a prefixed component. Thus, at line 14, foundPrefixedComponentTarget is set to YES. During iteration 2, target is y. At line 13, the algorithm checks whether y produces a prefixed component. Because y is a list item, it produces a prefixed component. Thus, at line 14, foundPrefixedComponentTarget is set to YES (but since this was already done in iteration 1, this iteration ultimately has no effect). During iteration 3, target is pr. At line 13, the algorithm checks whether pr produces a prefixed component. Because pr is a proviso, it produces a definite component, not a prefixed component. Thus, the algorithm proceeds to line 15. At line 15, the algorithm checks whether foundPrefixedComponentTarget is YES. Because this is so, the algorithm proceeds to line 16. At line 16, additionalPrefixedComponentCount is decremented from 1 to 0. At line 17, the algorithm checks whether additionalPrefixedComponentCount is 0. Because this is so, the algorithm exits the for-loop at line 18 and proceeds to line 22.

Subroutine 3 of algorithm adds the additional prefixed components to components. At line 22, the algorithm checks whether additionalPrefixedComponentCount is greater than 0. Because additionalPrefixedComponentCount is 0, the algorithm proceeds to line 33.

Subroutine 4 of the algorithm finishes adding components to components. At line 33, the algorithm enters a for-loop. This for-loop iterates over each target in targets starting at the targetIndex (set to 0 at line 21). The targetIndex of b is 0, y is 1, pr is 2, II is 3, B is 4, i is 5, and DT is 6. During iteration 1, target is b. At line 34, the algorithm checks whether b produces a prefixed component. Because b is a list item, it produces a prefixed component. Thus, the algorithm proceeds to line 35. At line 35, the algorithm checks whether prefixedComponentTarget is nil. Because this is so (set at line 32), the algorithm sets prefixedComponentTarget to b at line 36. During iteration 2, target is y. At line 34, algorithm checks whether y produces a prefixed component. Because y is a list item, it produces a prefixed component. Thus, the algorithm proceeds to line 35. At line 35, algorithm checks whether prefixedComponentTarget is nil. Because prefixedComponentTarget is b (not nil), this iteration ultimately has no effect. During iteration 3, target is pr. At line 34, the algorithm checks whether pr produces a prefixed component. Because pr is a proviso, it produces a definite component, not a prefixed component. Thus, the algorithm proceeds to line 38. At line 38, the algorithm checks whether prefixedComponentTarget is not nil. Because prefixedComponentTarget is b (not nil), the algorithm proceeds to line 39. At line 39, the algorithm adds a prefixed component with b as its target to components, and then sets prefixedComponentTarget to nil at line 40. At line 41, the algorithm adds a definite component with pr as its target to components. At this point, components contains: (1) a prefixed component with b as its target; and (2) a definite component with pr as its target.

Iteration 4 is similar to iteration 1. During iteration 4, target is II. At line 34, the algorithm checks whether II produces a prefixed component. Because II is a list item, it produces a prefixed component. Thus, the algorithm proceeds to line 35. At line 35, the algorithm checks whether prefixedComponentTarget is nil. Because this is so (set at line 32), prefixedComponentTarget is set to II at line 36.

Iterations 5 and 6 are generally similar to iteration 2. During these iterations, target is B and i, respectively. At line 34, the algorithm checks whether each of these targets produces prefixed components. Because each is a list item, each produces a prefixed component. Thus, the algorithm proceeds to line 35. At line 35, the algorithm checks whether prefixedComponentTarget is nil. Because prefixedComponentTarget is II (not nil), these iterations ultimately have no effect.

Iteration 7 is generally similar to iteration 3. During this iteration, target is DT. At line 34, the algorithm checks whether DT produces a prefixed component. Because DT is a defined term, it produces a definite component, not a prefixed component. Thus, the algorithm proceeds to line 38. At line 38, the algorithm checks whether prefixedComponentTarget is not nil. Because prefixedComponentTarget is II (not nil), the algorithm proceeds to line 39. At line 39, a prefixed component with II as its target is added to components, and then prefixedComponentTarget is set to nil at line 40. At line 41, a definite component with DT as its target is added to components. The algorithm then exits the for-loop and proceeds to line 42. At line 42, the algorithm checks whether prefixedComponentTarget is not nil. Because prefixedComponentTarget is nil, the algorithm is done. At this point, components contains: (1) a prefixed component with b as its target, (2) a definite component with pr as its target, (3) a prefixed component with II as its target, and (4) a definite component with DT as its target. The initial value of additionalPrefixedComponentCount was 1. Thus, it should be expected for components to include one prefixed component, not two. However, because this cross-reference involves two targets that produce a definite component, it is impossible to create a cross-reference that includes only one prefixed component in this case.

The following description of Example 3 contemplates a situation in which additionalPrefixedComponentCount starts at 3. Subroutine 2 of the algorithm determines additional prefixed components to be added to components (i.e., the listing of determined 102 components). At line 6, additionalPrefixedComponentCount is set to 3. At line 7, the algorithm checks whether additionalPrefixedComponentCount is greater than 0. Because additionalPrefixedComponentCount is 3, the algorithm proceeds to line 8. At line 8, the algorithm checks whether the last (most senior) target in targets produces a prefixed component. The last target in targets is DT. Because DT is a defined term, it produces a definite component, not a prefixed component. Thus, the algorithm proceeds to line 10. At line 10, the algorithm checks whether additionalPrefixedComponentCount is greater than 0. Because additionalPrefixedComponentCount is 3, the algorithm proceeds to line 12. At line 12, the algorithm enters a for-loop. During iteration 1, target is b. At line 13, the algorithm checks whether b produces a prefixed component. Because b is a list item, it produces a prefixed component. Thus, at line 14, foundPrefixedComponentTarget is set to YES.

During iteration 2, target is y. At line 13, the algorithm checks whether y produces a prefixed component. Because y is a list item, it produces a prefixed component. Thus, at line 14, foundPrefixedComponentTarget is set to YES (but since this was already done in iteration 1, this iteration ultimately has no effect).

During iteration 3, target is pr. At line 13, the algorithm checks whether pr produces a prefixed component. Because pr is a proviso, it produces a definite component, not a prefixed component. Thus, the algorithm proceeds to line 15. At line 15, the algorithm checks whether foundPrefixedComponentTarget is YES. Because this is so, the algorithm proceeds to line 16. At line 16, additionalPrefixedComponentCount is decremented from 3 to 2. At line 17, the algorithm checks whether additionalPrefixedComponentCount is 0. Because additionalPrefixedComponentCount is 2, this if-branch has no effect, and the algorithm proceeds to line 19. At line 19, the algorithm sets foundPrefixedComponentTarget to NO.

During iteration 4, target is II. At line 13, the algorithm checks whether II produces a prefixed component. Because II is a list item, it produces a prefixed component. Thus, at line 14, the algorithm sets foundPrefixedComponentTarget to YES.

During iterations 5 and 6, target is B and i, respectively. At line 13, the algorithm checks whether each of these targets produces a prefixed component. Because each is a list item, each produces a prefixed component. Thus, at line 14, the algorithm sets foundPrefixedComponentTarget to YES (but since this was already done in iteration 4, these iterations ultimately have no effect).

During iteration 7, target is DT. At line 13, the algorithm checks whether DT produces a prefixed component. Because DT is a defined term, it produces a definite component, not a prefixed component. Thus, the algorithm proceeds to line 15. At line 15, the algorithm checks whether foundPrefixedComponentTarget is YES. Because this is so, the algorithm proceeds to line 16. At line 16, additionalPrefixedComponentCount is decremented from 2 to 1. At line 17, the algorithm checks whether additionalPrefixedComponentCount is 0. Because additionalPrefixedComponentCount is 1, this if-branch has no effect, and the algorithm proceeds to line 19. At line 19, foundPrefixedComponentTarget is set to NO. Since DT is the last target in targets, the algorithm exits the for-loop and proceeds to line 22.

Subroutine 3 of the algorithm adds the additional prefixed components to components. At line 22, the algorithm checks whether additionalPrefixedComponentCount is greater than 0. Because additionalPrefixedComponentCount is 1, the algorithm proceeds to line 23. At line 23, the algorithm enters a for-loop. During iteration 1, target is b. At line 24, targetIndex is incremented from 0 to 1. At line 25, the algorithm checks whether b produces a prefixed component. Because b is a list item, it produces a prefixed component. Thus, at line 26, a prefixed component with b as its target is added to components; and at line 27, additionalPrefixedComponentCount is decremented from 1 to 0. At line 28, the algorithm checks whether additionalPrefixedComponentCount is 0. Because this is so, the algorithm exits the for-loop at line 29 and proceeds to line 33. At this point, components contains one prefixed component with b as its target.

Subroutine 4 finishes adding components to components. At line 33, the algorithm enters a for-loop. This for-loop iterates over each target in targets starting at the targetIndex (1). The targetIndex of b is 0, y is 1, pr is 2, II is 3, B is 4, i is 5, and DT is 6. During iteration 1, target is y. At line 34, the algorithm checks whether y produces a prefixed component. Because y is a list item, it produces a prefixed component. Thus, the algorithm proceeds to line 35. At line 35, the algorithm checks whether prefixedComponentTarget is nil. Because this is so (set at line 32), prefixedComponentTarget is set to y at line 36.

During iteration 2, target is pr. At line 34, the algorithm checks whether pr produces a prefixed component. Because pr is a proviso, it produces a definite component, not a prefixed component. Thus, the algorithm proceeds to line 38. At line 38, the algorithm checks whether prefixedComponentTarget is not nil. Because prefixedComponentTarget is y (not nil), the algorithm proceeds to line 39. At line 39, a prefixed component with y as its target is added to components, and then prefixedComponentTarget is set to nil at line 40. At line 41, a definite component with pr as its target is added to components. At this point, components contains: (1) a prefixed component with b as its target, (2) a prefixed component with y as its target, and (3) a definite component with pr as its target.

During iteration 3, target is II. At line 34, the algorithm checks whether II produces a prefixed component. Because II is a list item, it produces a prefixed component. Thus, the algorithm proceeds to line 35. At line 35, the algorithm checks whether prefixedComponentTarget is nil. Because this is so, prefixedComponentTarget is set to II at line 36.

During iterations 4 and 5, target is B and i, respectively. At line 34, the algorithm checks whether each of these targets produces a prefixed component. Because each is a list item, each produces a prefixed component. Thus, the algorithm proceeds to line 35. At line 35, the algorithm checks whether prefixedComponentTarget is nil. Because prefixedComponentTarget is II (not nil), these iterations ultimately have no effect.

During iteration 6, target is DT. At line 34, the algorithm checks whether DT produces a prefixed component. Because DT is a defined term, it produces a definite component, not a prefixed component. Thus, the algorithm proceeds to line 38. At line 38, the algorithm checks whether prefixedComponentTarget is not nil. Because prefixedComponentTarget is II (not nil), the algorithm proceeds to line 39. At line 39, a prefixed component with II as its target is added to components, and then prefixedComponentTarget is set to nil at line 40. At line 41, a definite component with DT as its target is added to components.

The algorithm then exits the for-loop and proceeds to line 42. At line 42, the algorithm checks whether prefixedComponentTarget is not nil. Because prefixedComponentTarget is nil, the algorithm is done. At this point, components contains: (1) a prefixed component with b as its target, (2) a prefixed component with y as its target, (3) a definite component with pr as its target, (4) a prefixed component with II as its target, and (5) a definite component with DT as its target. As expected based on the initial value of additionalPrefixedComponentCount (3), components includes three prefixed components.

The following description of Example 3 contemplates a situation in which additionalPrefixedComponentCount starts at 5. Subroutine 2 of the algorithm determines additional prefixed components to be added to components (i.e., the listing of determined 102 components). At line 6, additionalPrefixedComponentCount is set to 5. At line 7, the algorithm checks whether additionalPrefixedComponentCount is greater than 0. Because additionalPrefixedComponentCount is 5, the algorithm proceeds to line 8. At line 8, the algorithm checks whether the last (most senior) target in targets produces a prefixed component. The last target in targets is DT. Because DT is a defined term, it produces a definite component, not a prefixed component. Thus, the algorithm proceeds to line 10. At line 10, the algorithm checks whether additionalPrefixedComponentCount is greater than 0. Because additionalPrefixedComponentCount is 5, the algorithm proceeds to line 12. At line 12, the algorithm enters a for-loop. During iteration 1, target is b. At line 13, the algorithm checks whether b produces a prefixed component. Because b is a list item, it produces a prefixed component. Thus, at line 14, foundPrefixedComponentTarget is set to YES.

During iteration 2, target is y. At line 13, the algorithm checks whether y produces a prefixed component. Because y is a list item, it produces a prefixed component. Thus, at line 14, foundPrefixedComponentTarget is set to YES (but since this was already done in iteration 1, this iteration ultimately has no effect).

During iteration 3, target is pr. At line 13, the algorithm checks whether pr produces a prefixed component. Because pr is a proviso, it produces a definite component, not a prefixed component. Thus, the algorithm proceeds to line 15. At line 15, the algorithm checks whether foundPrefixedComponentTarget is YES. Because this is so, the algorithm proceeds to line 16. At line 16, additionalPrefixedComponentCount is decremented from 5 to 4. At line 17, the algorithm checks whether additionalPrefixedComponentCount is 0. Because additionalPrefixedComponentCount is 4, this if-branch has no effect, and the algorithm proceeds to line 19. At line 19, foundPrefixedComponentTarget is set to NO.

During iteration 4, target is II. At line 13, the algorithm checks whether II produces a prefixed component. Because II is a list item, it produces a prefixed component. Thus, at line 14, foundPrefixedComponentTarget is set to YES.

During Iterations 5 and 6, target is B and i, respectively. At line 13, the algorithm checks whether each of these targets produces a prefixed component. Because each is a list item, each produces a prefixed component. Thus, at line 14, the algorithm sets foundPrefixedComponentTarget to YES (but since this was already done in iteration 4, these iterations ultimately have no effect).

During iteration 7, target is DT. At line 13, the algorithm checks whether DT produces a prefixed component. Because DT is a defined term, it produces a definite component, not a prefixed component. Thus, the algorithm proceeds to line 15. At line 15, the algorithm checks whether foundPrefixedComponentTarget is YES. Because this is so, the algorithm proceeds to line 16. At line 16, additionalPrefixedComponentCount is decremented from 4 to 3. At line 17, the algorithm checks whether additionalPrefixedComponentCount is 0. Because additionalPrefixedComponentCount is 3, this if-branch has no effect, and the algorithm proceeds to line 19. At line 19, foundPrefixedComponentTarget is set to NO. Since DT is the last target in targets, the algorithm exits the for-loop and proceeds to line 22.

Subroutine 3 of the algorithm adds the additional prefixed components to components. At line 22, the algorithm checks whether additionalPrefixedComponentCount is greater than 0. Because additionalPrefixedComponentCount is 3, the algorithm proceeds to line 23. At line 23, the algorithm enters a for-loop. During iteration 1, target is b. At line 24, targetIndex is incremented from 0 to 1. At line 25, the algorithm checks whether b produces a prefixed component. Because b is a list item, it produces a prefixed component. Thus, at line 26, a prefixed component with b as its target is added to components; and at line 27, additionalPrefixedComponentCount decremented from 3 to 2. At line 28, the algorithm checks whether additionalPrefixedComponentCount is 0. Because additionalPrefixedComponentCount is 2, this if-branch has no effect.

During iteration 2, target is y. At line 24, targetIndex is incremented from 1 to 2. At line 25, the algorithm checks whether y produces a prefixed component. Because y is a list item, it produces a prefixed component. Thus, at line 26, a prefixed component with y as its target is added to components; and at line 27, additionalPrefixedComponentCount is decremented from 2 to 1. At line 28, the algorithm checks whether additionalPrefixedComponentCount is 0. Because additionalPrefixedComponentCount is 1, this if-branch has no effect.

During iteration 3, target is pr. At line 24, targetIndex is incremented from 2 to 3. At line 25, the algorithm checks whether pr produces a prefixed component. Because pr is a proviso, it produces a definite component, not a prefixed component. Thus, the algorithm proceeds to line 31. At line 31, a definite component with pr as its target is added to components.

During iteration 4, which is similar to iteration 1, target is II. At line 24, targetIndex is incremented from 3 to 4. At line 25, the algorithm checks whether II produces a prefixed component. Because II is a list item, it produces a prefixed component. Thus, at line 26, a prefixed component with II as its target is added to components; and at line 27, additionalPrefixedComponentCount is decremented from to 0. At line 28, the algorithm checks whether additionalPrefixedComponentCount is 0. Because this is so, the algorithm exits the for-loop at line 29 and proceeds to line 33. At this point, components contains: (1) a prefixed component with b as its target, (2) a prefixed component with y as its target, (3) a definite component with pr as its target, and (4) a prefixed component with II as its target.

Subroutine 4 finishes adding components to components. At line 33, the algorithm enters a for-loop. This for-loop iterates over each target in targets starting at the targetIndex (4). The targetIndex of b is 0, y is 1, pr is 2, II is 3, B is 4, i is 5, and DT is 6. During iteration 1, target is B. At line 34, the algorithm checks whether B produces a prefixed component. Because B is a list item, it produces a prefixed component. Thus, the algorithm proceeds to line 35. At line 35, the algorithm checks whether prefixedComponentTarget is nil. Because this is so (set at line 32), prefixedComponentTarget is set to B at line 36.

During iteration 2, target is i. At line 34, the algorithm checks whether I produces a prefixed component. Because i is a list item, it produces a prefixed component. Thus, the algorithm proceeds to line 35. At line 35, the algorithm checks whether prefixedComponentTarget is nil. Because prefixedComponentTarget is B (not nil), this iteration ultimately has no effect.

During iteration 3, target is DT. At line 34, the algorithm checks whether DT produces a prefixed component. Because DT is a defined term, it produces a definite component, not a prefixed component. Thus, the algorithm proceeds to line 38. At line 38, the algorithm checks whether prefixedComponentTarget is not nil. Because prefixedComponentTarget is B (not nil), the algorithm proceeds to line 39. At line 39, a prefixed component with B as its target is added to components, and then prefixedComponentTarget is set to nil at line 40. At line 41, a definite component with DT as its target is added to components. The algorithm then exits the for-loop and proceeds to line 42. At line 42, the algorithm checks whether prefixedComponentTarget is not nil. Because prefixedComponentTarget is nil, the algorithm is done. At this point, components contains: (1) a prefixed component with b as its target, (2) a prefixed component with y as its target, (3) a definite component with pr as its target, (4) a prefixed component with II as its target, (5) a prefixed component with B as its target, and (6) a definite component with DT as its target. The initial value of additionalPrefixedComponentCount was 5. Thus, it would be expected for components to include five prefixed components, not four. However, because this cross-reference involves only four targets that produce prefixed components, it's impossible to create a cross-reference that includes five prefixed components in this case.

Cross-reference process 10 may further create 104 a cross-reference based upon, at least in part, the components for the cross-reference. For example, utilizing the components determined 102, e.g., using a process described in connection with the illustrative pseudocode provided above or another suitable method, cross-reference process 10 may create 104 a cross-reference. An illustrative example algorithm for creating 104 the cross-reference based upon, at least in part, the components of the cross-reference target is provided below in pseudocode (Pseudocode 2). It will be appreciated that the features and operation of cross-reference process 10 may be implemented in various additional and/or alternative manners. As such, the illustrative pseudocode herein should not be construed as a limitation of the present disclosure.

| Pseudocode 2 |
| --- |
| 1  let component be the first component in components |
| 2  append component to the cross-reference |
| 3  if the count of components is greater than 1 |
| 4      append component's separator to the cross-reference |
| 5      for each component in components from the 2nd to the 2nd-to-last |
| 6          append component to the cross-reference |
| 7          append component's separator to the cross-reference |
| 8      append the last component in components to the cross-reference |

In an embodiment, cross-reference process 10 may create 104 a cross-reference utilizing a technique consistent with the above illustrative pseudocode. It will be appreciated that techniques other than the technique of the illustrative pseudocode may be implemented for creating 104 a cross-reference. By way of example, an approach will be described for creating a cross-reference to the following hierarchically structured document portion, in which the portion to be cross-referenced is "(b) exercitation ullamco laboris."

| 1 | 1. | Defined Terms. | |
|---|---|---|---|
| a | | (a) Defined Terms. | |
| DT | | | "Defined Term" means: |
| i | | | (i) lorem ipsum; |
| | | | (A) dolor sit amet; |
| B | | | (B) consectetur adipisicing elit; |
| | | | (I) sed do eiusmod tempor; |
| II, pr | | | (II) incididunt ut labore, provided, however, that (x) et |
| y | | | dolore magna aliqua, (y) ut enim ad minim (a) veniam quis |
| b | | | nostrud (b) exercitation ullamco laboris. |

In this illustrative example, the "algorithm" is intended to indicate all operations and processes that may be performed by the example Pseudocode 2. Additionally, in this example, components are indicated by the component's target in brackets. For example, a component with b as its target is represented as [b]. The list components contains four components: (1) a prefixed component with b as its target, (2) a definite component with pr as its target, (3) a prefixed component with II as its target, and (4) a definite component with DT as its target. At line 2, the first component in components—[b]—is appended to the cross-reference. At line 3, the algorithm checks whether the count of components is greater than 1. Since the count of components is 4, the algorithm proceeds to line 4. At line 4, [b]'s separator (of) may be appended to the cross-reference.

At line 5, the algorithm enters a for-loop. This for-loop iterates over each component in components from the second to the second-to-last. During iteration 1, component is [pr]. At line 6, [pr] is appended to the cross-reference, and at line 7, [pr]'s separator (to) is appended to the cross-reference. During iteration 2, component is [II]. At line 6, [II] is appended to the cross-reference, and at line 7, [II]'s separator (of) is appended to the cross-reference. Since [II] is the second-to-last component in components, the algorithm exits the for-loop and proceeds to line 8. At line 8, [DT] is appended to the cross-reference, and the algorithm is done. At this point, the cross-reference is: [b] of [pr] to [II] of [DT]. After these components get information about themselves from other sources (e.g., which may define the style or formatting schema applied to the portion of the document including the cross-reference target), this cross-reference might read: "clause (b) of the proviso to clause (II) of the definition of Defined Term." It will be appreciated that other forms of the cross-reference may be created 104, e.g., based upon, at least in part, different style or format schema.

With continued reference to the illustrated embodiment of FIG. 5, in an embodiment, once the user has selected desired cross-reference target 156 (e.g., by clicking or otherwise selecting cross-reference target 156, cross-reference process 10 may provide a preview 158 of the cross-reference (e.g., which may be inserted into the selected location for the cross-reference).

Figure 6:
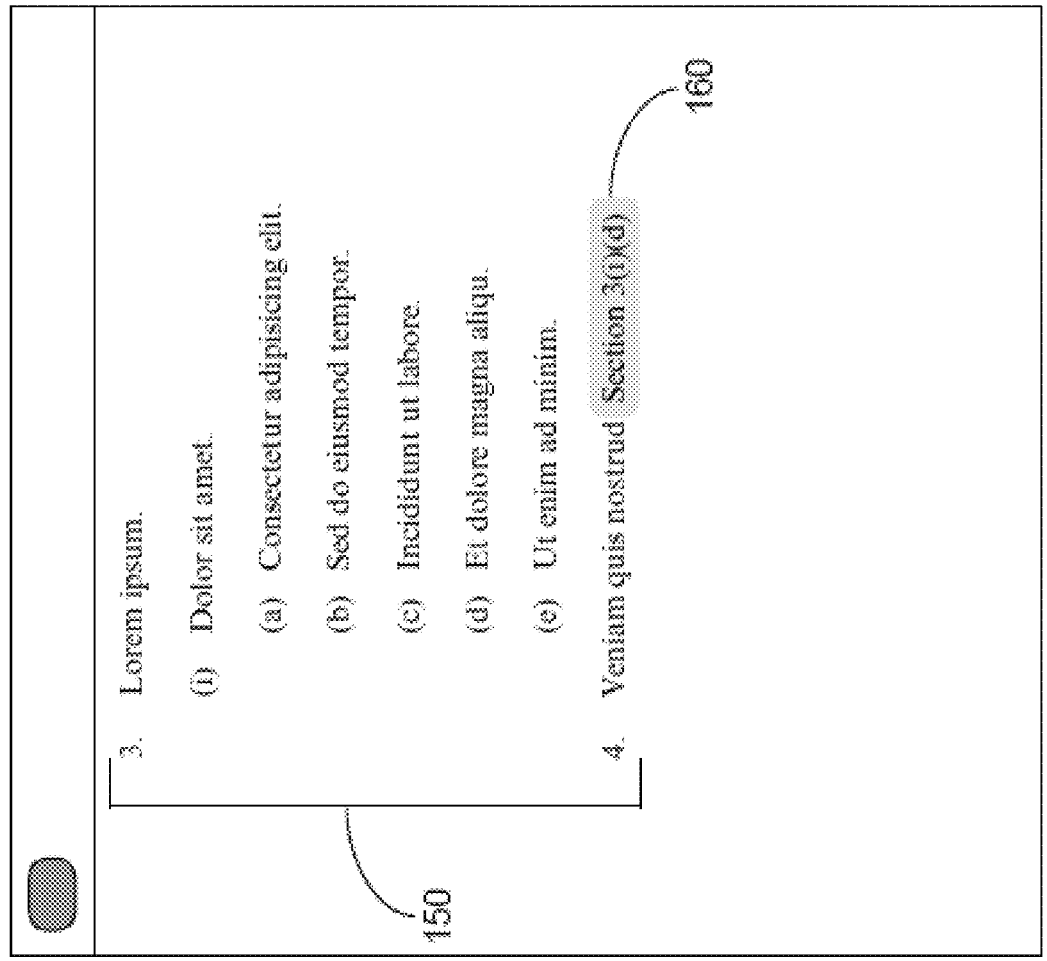
FIG. 6 is a diagrammatic view of an example of a cross-reference process according to an illustrative embodiment.

Referring also to FIG. 6, in response to the user selecting the cross-reference target, cross-reference process 10 may create 104 the cross-reference. In an embodiment, creating the cross-reference may include inserting cross-reference 160 into document 150 at the selected location 152 for the cross-reference. In an embodiment, inserting cross-reference 160 into document 150 may be in response to the user approving a preview 158 of the cross-reference. For example, the user may click (e.g., using a pointing device and an onscreen pointer, or other suitable techniques) preview 158.

In an embodiment, once cross-reference 160 has been inserted into document 150, the user may click cross-reference 160 to view cross-reference target 156. In an embodiment, in response to the user selecting cross-reference 160, cross-reference process 10 may navigate to the portion of document 150 that includes the cross-reference target. In another embodiment, in response to the user clicking cross-reference 160, cross-reference process 10 may show a window, or other feature, which may include cross-reference target 156, either alone or including surrounding portions of document 150.

Figure 7:
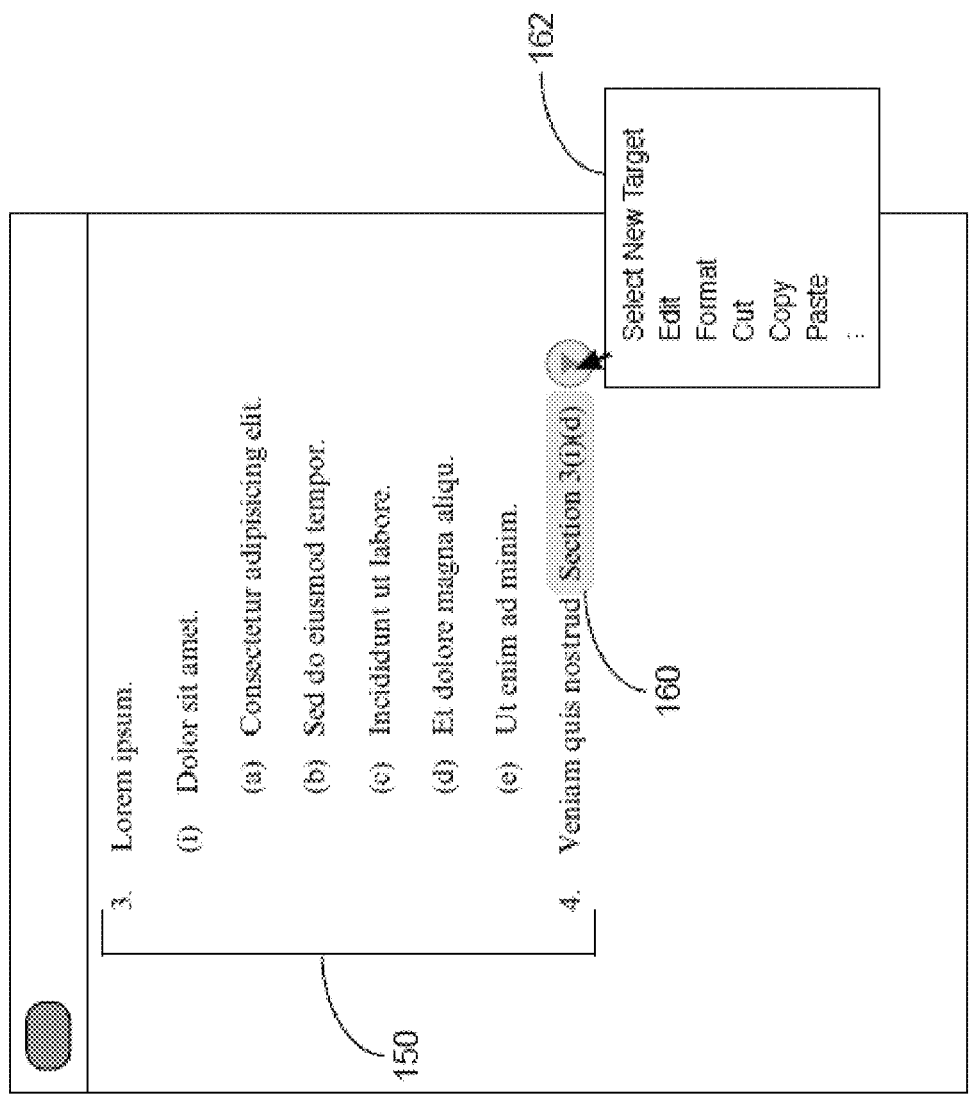
FIG. 7 is a diagrammatic view of an example of a cross-reference process according to an illustrative embodiment.

In some embodiments, cross-reference process 10 may allow the user to change or customize the style or format of cross-reference 160. For example, and referring also to FIG. 7, in an embodiment the user may select cross-reference 160, e.g., by right-clicking cross-reference 160, or via another technique. Referring also to FIG. 7, in response to the user right-clicking cross-reference 160, cross-reference process 10 may show menu 162. Menu 162 may provide various options, such as "select new target," which may allow the user to define a different cross-reference target to cross-reference.

Figure 8:
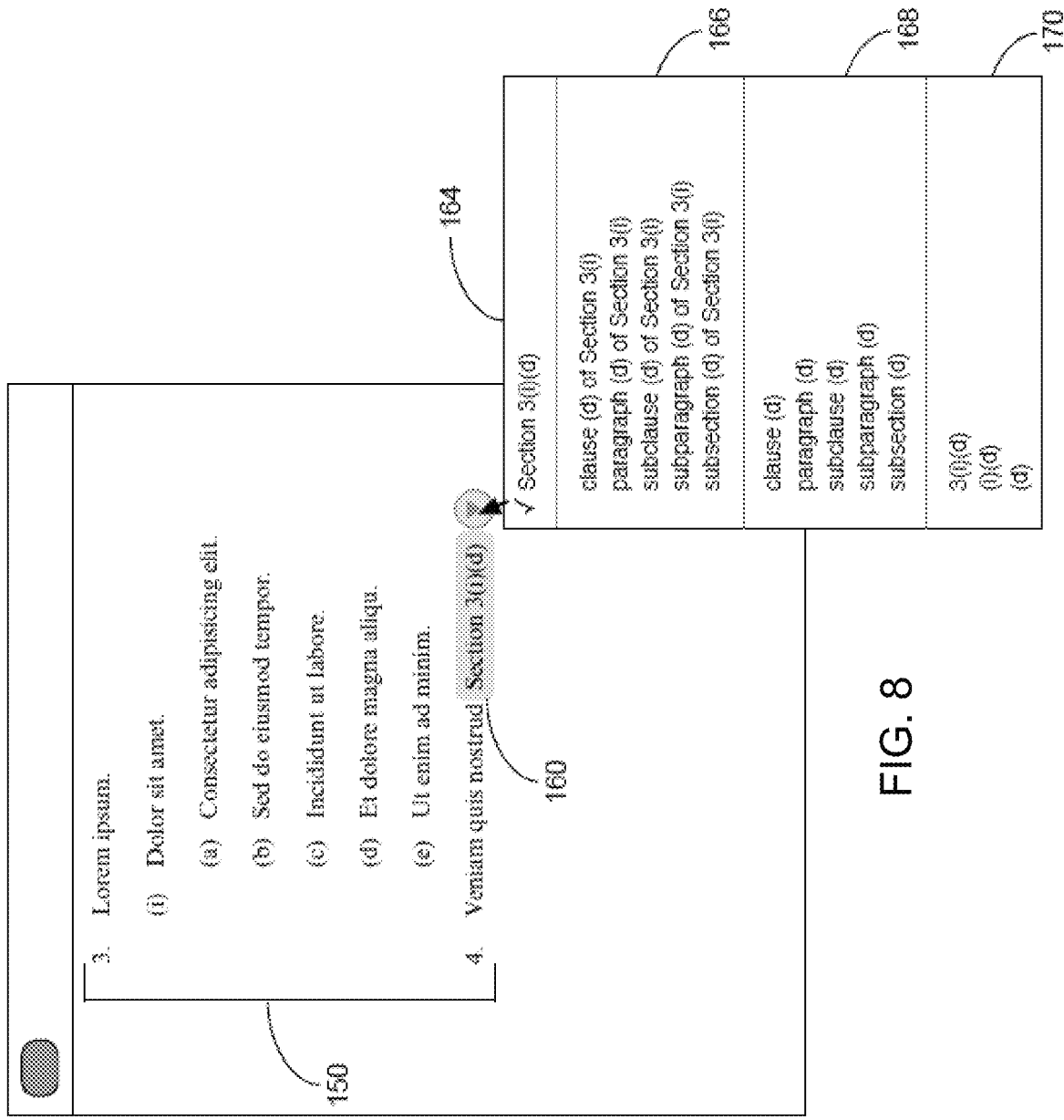
FIG. 8 is a diagrammatic view of an example of a cross-reference process according to an illustrative embodiment.

In some embodiments, and referring also to FIG. 8, in response to the user right-clicking or otherwise selecting cross-reference 160, cross-reference process 10 may provide menu 164. As shown, menu 164 may provide various presentation options for cross-reference 160. For example, menu 164 may include a plurality of options, generally group 166, in which the cross-reference may be presented using two prefixed components. In an embodiment, the algorithms illustrated by the pseudocode above may achieve the options in group 166 by initializing additionalPrefixedComponentCount as 2 (at line 6 of the example Pseudocode 1). Menu 164 may also include a plurality of options, generally group 168, in which the cross-reference may be presented as one prefixed component derived from a truncated list of targets. Such a presentation may be achieved by setting truncationAmount to an appropriate number (at line 2 of the example Pseudocode 1). Further, menu 164 may include a plurality of options, generally group 170, in which the cross-reference may be derived from a list of targets that has been truncated to various degrees. It will be appreciated that various additional and/or alternative cross-reference presentation options may be provided. In response to the user selecting an option from menu 164, cross-reference process 10 may alter the cross-reference 160 consistent with the user selection.

Cross-reference process 10 may update 110 the cross-reference based upon, at least in part, a change in a hierarchical position of the cross-reference target within the hierarchically structured document. For example, through the process of editing document 150, the location of the cross-reference target within the hierarchical structure of document 150 may change. For example, additional hierarchical levels may be added and/or removed. Similarly, the cross-reference target may be moved within document 150, such that the cross-reference target may have a different location within the hierarchical structure of document. In an embodiment, the cross-reference may include an index associated with the cross-reference target and ancestors of the cross-reference target. The plain language format or style of the cross-reference may be applied based upon the index associated with the cross-reference target and its ancestors. In the event of a change in the location of the cross-reference target within the hierarchical structure of document, the index associated with the cross-reference target may change accordingly. Accordingly, cross-reference process 10 may update 110 the cross-reference based upon, at least in part, the change in a hierarchical position of the cross-reference target, e.g., by applying selected style and/or formatting schema across the changed index of the cross-reference target.

Figure 9:
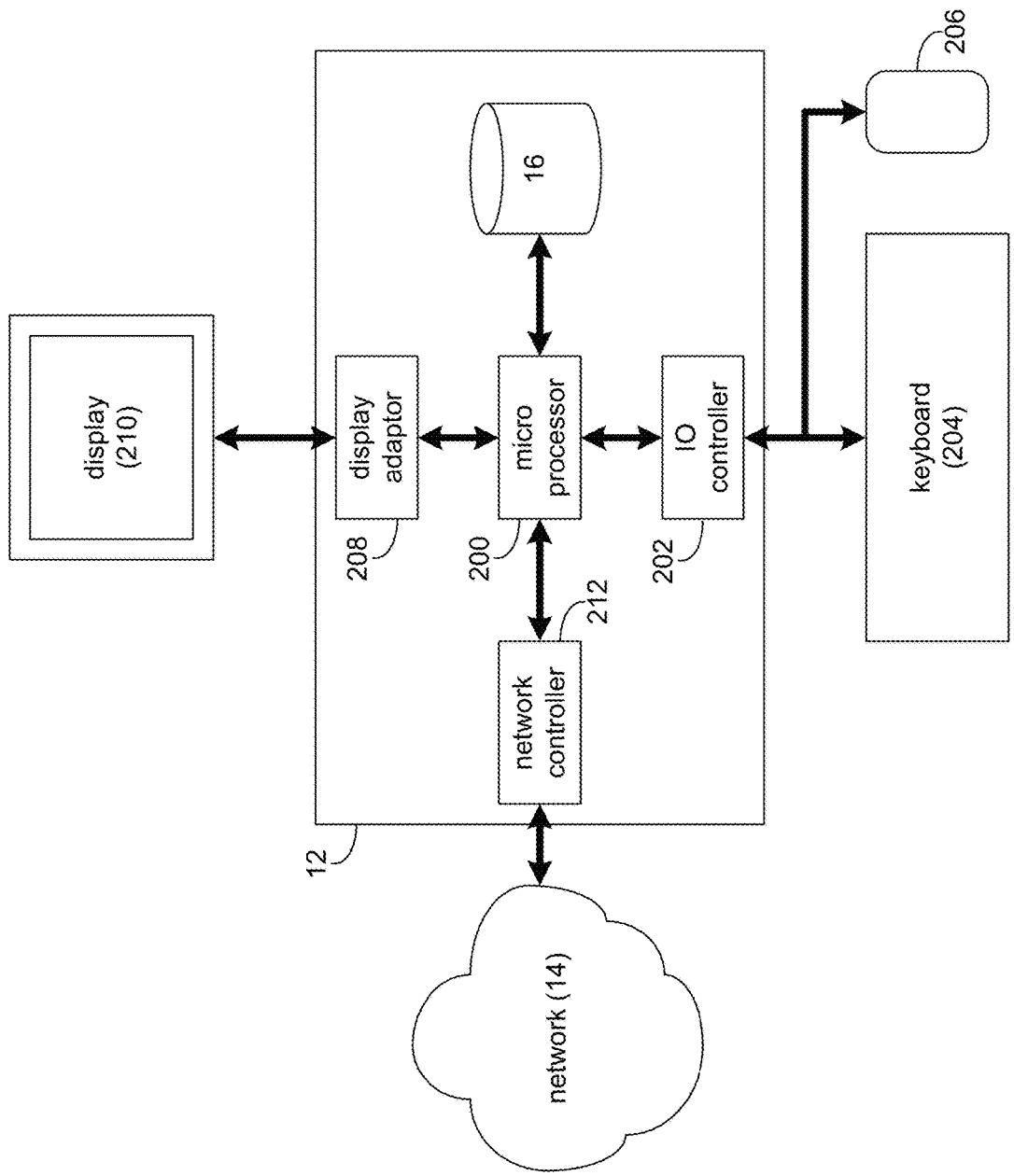
FIG. 9 is a diagrammatic view of a computing device of FIG. 1 according to an example embodiment of the present disclosure.

Referring also to FIG. 9, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, cross-reference process 10 may be substituted for computing device 12 within FIG. 9 examples of which may include but are not limited to client electronic devices 28, 30, 32, 34.

Computing system 12 may include microprocessor 200 configured to e.g., process data and execute instructions/code for cross-reference process 10. Microprocessor 200 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 202 may be configured to couple microprocessor 200 with various devices, such as keyboard 204, mouse 206, USB ports (not shown), and printer ports (not shown). Display adaptor 208 may be configured to couple display 210 (e.g., a CRT or LCD monitor) with microprocessor 200, while network adapter 212 (e.g., an Ethernet adapter) may be configured to couple microprocessor 200 to network 14 (e.g., the Internet or a local area network).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
   identifying, by a processor, a cross-reference target, wherein the cross-reference target includes a portion of text within a hierarchically structured document;
   determining, by the processor, one or more components of a cross-reference based upon, at least in part, a hierarchical position of the cross-reference target within the hierarchically structured document including:
      creating a list including the cross-reference target and at least a portion of ancestors of the cross-reference target,
      adding components to a list of components for the cross-reference target and the at least a portion of ancestors of the cross-reference target, wherein the at least a portion of ancestors of the cross-reference target provide context for the cross-reference,
      categorizing each component added to the list of components as one of a definite component and a prefixed component, wherein the definite component is a textual description of only the cross-reference target and the prefixed component is a textual description of the hierarchical location of the cross-reference target and hierarchical locations of the at least a portion of ancestors of the cross-reference target, and
      determining a number of additional prefixed components to be added to the list of components, wherein the number of additional prefixed components include a preferred number of prefixed components minus a number of targets in the list including the cross-reference target that produce the definite component when the list of components includes at least one definite component; and
   creating, by the processor, the cross-reference based upon, at least in part, the list of components for the cross-reference, wherein the cross-reference describes the hierarchical position of the cross-reference target within the hierarchically structured document, wherein creating the cross-reference includes removing the at least a portion of ancestors of the cross-reference target from an end of the list of components for the cross-reference target to provide a truncated list of target components.

2. The computer-implemented method of claim 1, wherein the hierarchically structured document includes a legal agreement.

3. The computer-implemented method of claim 1, wherein determining the one or more components of the cross-reference includes identifying one or more ancestors of the cross-reference target within the hierarchically structured document.

4. The computer-implemented method of claim 3, wherein determining the one or more components of the cross-reference includes determining one or more components for each of the one or more ancestors of the cross-reference target.

5. The computer-implemented method of claim 1, further comprising updating the cross-reference based upon, at least in part, a change in a hierarchical position of the cross-reference target within the hierarchically structured document.

6. A computer program product comprising a non-transitory computer readable storage medium having a plurality of instructions stored thereon, which, when executed by a processor, cause the processor to perform operations including:

identifying a cross-reference target, wherein the cross-reference target includes a portion of text within a hierarchically structured document;

determining one or more components of a cross-reference based upon, at least in part, a hierarchical position of the cross-reference target within the hierarchically structured document including:

creating a list including the cross-reference target and at least a portion of ancestors of the cross-reference target, adding components to a list of components for the cross-reference target and the at least a portion of ancestors of the cross-reference target, wherein the at least a portion of ancestors of the cross-reference target provide context for the cross-reference, categorizing each component added to the list of components as one of a definite component and a prefixed component, wherein the definite component is a textual description of only the cross-reference target and the prefixed component is a textual description of the hierarchical location of the cross-reference target and hierarchical locations of the at least a portion of ancestors of the cross-reference target, and determining a number of additional prefixed components to be added to the list of components, wherein the number of additional prefixed components include a preferred number of prefixed components minus a number of targets in the list including the cross-reference target that produce the definite component when the list of components includes at least one definite component; and creating the cross-reference based upon, at least in part, the list of components for the cross-reference, wherein the cross-reference describes the hierarchical position of the cross-reference target within the hierarchically structured document, wherein creating the cross-reference includes removing the at least a portion of ancestors of the cross-reference target from an end of the list of components for the cross-reference target to provide a truncated list of target components.

7. The computer program product of claim 6, wherein the hierarchically structured document includes a legal agreement.

8. The computer program product of claim 6, wherein determining the one or more components of the cross-reference includes identifying one or more ancestors of the cross-reference target within the hierarchically structured document.

9. The computer program product of claim 8, wherein determining the one or more components of the cross-reference includes determining one or more components for each of the one or more ancestors of the cross-reference target.

10. The computer program product of claim 6, further comprising instructions for updating the cross-reference based upon, at least in part, a change in a hierarchical position of the cross-reference target within the hierarchically structured document.

11. A computing system comprising:
a processor and a memory module coupled with the processor, the processor being configured for:

identifying a cross-reference target within a hierarchically structured document;

determining one or more components of a cross-reference based upon, at least in part, a hierarchical position of the cross-reference target within the hierarchically structured document including:

creating a list including the cross-reference target and at least a portion of ancestors of the cross-reference target, adding components to a list of components for the cross-reference target and the at least a portion of ancestors of the cross-reference target, wherein the at least a portion of ancestors of the cross-reference target provide context for the cross-reference, categorizing each component added to the list of components as one of a definite component and a prefixed component, wherein the definite component is a textual description of only the cross-reference target and the prefixed component is a textual description of the hierarchical location of the cross-reference target and hierarchical locations of the at least a portion of ancestors of the cross-reference target, and determining a number of additional prefixed components to be added to the list of components, wherein the number of additional prefixed components include a preferred number of prefixed components minus a number of targets in the list including the cross-reference target that produce the definite component when the list of components includes at least one definite component; and creating the cross-reference based upon, at least in part, the components for the cross-reference, wherein the cross-reference describes the hierarchical position of the cross-reference target within the hierarchically structured document, wherein creating the cross-reference includes removing the at least a portion of ancestors of the cross-reference target from an end of the list of components for the cross-reference target to provide a truncated list of target components.

12. The computing system of claim 11, wherein the hierarchically structured document includes a legal agreement.

13. The computing system of claim 11, wherein determining the one or more components of the cross-reference includes identifying one or more ancestors of the cross-reference target within the hierarchically structured document.

14. The computing system of claim 13, wherein determining the one or more components of the cross-reference includes determining one or more components for each of the one or more ancestors of the cross-reference target.

15. The computing system of claim 11, wherein the processor is further configured for updating the cross-reference based upon, at least in part, a change in a hierarchical position of the cross-reference target within the hierarchically structured document.

* * * * *